(12) United States Patent
Suzuki

(10) Patent No.: US 7,965,411 B2
(45) Date of Patent: Jun. 21, 2011

(54) IMAGE FORMING APPARATUS AND METHOD FOR FASTER RENDERING OF MONOCHROMATIC SCAN LINES

(75) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/219,480

(22) Filed: Sep. 2, 2005

(65) Prior Publication Data

US 2006/0050319 A1  Mar. 9, 2006

(30) Foreign Application Priority Data

Sep. 3, 2004  (JP) ................. 2004-257421

(51) Int. Cl.
*G06F 3/12* (2006.01)
*H04N 1/40* (2006.01)
(52) U.S. Cl. ........................ 358/1.7; 358/3.24
(58) Field of Classification Search ............. 358/1.7, 358/3.24, 1.15; 382/242
See application file for complete search history.

(56) References Cited

U.S. PATENT DOCUMENTS

| 5,548,689 A * | 8/1996 | Poppenga et al. ............. 358/1.9 |
| 6,693,719 B1 * | 2/2004 | Gupta et al. ................. 358/1.15 |
| 6,728,412 B1 * | 4/2004 | Vasylyev ..................... 382/242 |
| 6,828,985 B1 * | 12/2004 | Long et al. .................... 345/620 |

FOREIGN PATENT DOCUMENTS

JP  2000-137825  5/2000

* cited by examiner

*Primary Examiner* — Benny Q Tieu
*Assistant Examiner* — Sunil Chacko
(74) *Attorney, Agent, or Firm* — Cowan, Liebowitz & Latman, P.C.

(57) ABSTRACT

An image forming apparatus for rendering graphics objects in a frame memory, which includes a line memory for storing dot image data for each scan line of the graphics objects, a deciding unit that decides a position of a difference pixel having different values of corresponding pixels between the scan line stored in the line memory and a target scan line immediately thereafter, and a difference updating unit that, of the dot image data stored in the line memory, updates a value of the difference pixel decided by the deciding unit to the value of the pixel in the target scan line.

9 Claims, 26 Drawing Sheets

FIG. 5

| Area INFORMATION | RECTANGLE / TRAPEZOID / RUN LENGTH / BINARY BIT MAP | ~501 |
|---|---|---|
| Mask INFORMATION | RECTANGLE / TRAPEZOID / RUN LENGTH / BINARY BIT MAP | ~502 |
| BG INFORMATION | PATTERN / MONOCHROME / IMAGE | ~503 |
| GRAY INFORMATION | PATTERN / MONOCHROME / IMAGE | ~504 |

IMAGE FORMING APPARATUS AND METHOD FOR FASTER RENDERING OF MONOCHROMATIC SCAN LINES

FIELD OF THE INVENTION

The present invention relates to an image forming apparatus and an image forming method for implementing an image forming process by using an image property such as a high-resolution image, and a program for implementing the image forming method.

BACKGROUND OF THE INVENTION

Conventionally, Painter's algorithm is known as a method of performing a rasterizing process on a page printer. According to the Painter's algorithm, a mutual positional relation of graphics objects to be rendered is examined in advance, then the graphics object to be rendered in a backmost portion is first rendered to a frame store.

The Painter's algorithm has two problems. The first problem is that random access may occur to all the pixels in the frame store, and so a minute area of the frame store to be accessed cannot be identified in advance. For that reason, time for the rasterizing process is constrained by the product of the number of the pixels configuring all the graphics objects and the transfer time decided by physical transfer rate of a memory in which the frame store is placed. The second problem is that, in the case where the graphics objects are overlapping, the graphics object in the back is overpainted by the graphics object in the front, and so the time required to rasterize the overpainted area is wasted (called a problem of overwriting).

One of the methods for alleviating the two problems of the Painter's algorithm is banding. Banding is a method of dividing the frame store like bands and also dividing the graphics objects like bands in advance. In the case of banding, the memory to be accessed is limited to divided band-like areas (band areas). Therefore, it is possible to increase the probability of cache-hitting compared to the case of having a cache memory to access the entire frame store for instance. For this reason, the time for the rasterizing process is no longer constrained by the product of the number of the pixels configuring all the graphics objects and the transfer time decided by the physical transfer rate of the memory in which the frame store is placed. In the case of banding, however, the frame store is divided into several to several tens of pieces so that a cache-hit rate is not dramatically improved. The problem of overwriting cannot be solved either.

A method of causing no overwriting of the object which is the problem of the Painter's algorithm (called a second method) is also conceived. In one example of such a method, rendering of the objects is performed by using the following procedure. An image formed in the frame store is created in raster scan order. Coordinates of an intersection of each raster line and each object are acquired. For each pixel between the intersection coordinates, the object to be rendered is determined based on information on a level of the graphics objects included in the line (information indicating the mutual positional relation of the overlapping graphics objects in a direction of depth) and colors of the graphics objects. Rendering is performed between the intersections in a color corresponding to the object decided as a result of the determination. This is performed while updating the intersections with the graphics objects for each line (refer to Japanese Patent Laid-Open No. 2000-137825).

However, the above-mentioned conventional technique is not the one exploiting an image property of a high-resolution image. To be more specific, in the case of a high-resolution image, an arbitrary pixel in the image and a pixel in proximity thereto are highly likely to be of the same color value (this property is called spatial locality). This is because, as the objects included in the image has a certain expanse, the number of the pixels configuring one object increases when the resolution is high and the spatial locality becomes more obvious as a result thereof. For this reason, it is highly likely that an arbitrary pixel of an arbitrary line in an arbitrary frame store and a corresponding pixel in the line following it (that is, the pixel at the same position from an end of the line) have the same color value. The conventional technique performs an independent process for each individual line. For that reason, each individual line is generated independently even in the case where there are only a small number of pixels mutually corresponding and having differences in the color values or in the case where there is none. In other words, it is necessary to repeat the process even on the pixel which has the same color value as the pixel of the same position on the preceding line, which is waste of time.

In the case of the above-mentioned Painter's algorithm, the access to the frame store is random. The access is sequential in the second method. In the case where the access to the frame store is random, the pixels likely to be accessed are the entire frame store or the band areas according to the conventional technique. Therefore, an effect of a memory cache cannot be expected, or the effect is low. In the case of the second method, it is necessary to determine the color value transferred to the frame store from the mutual positional relation of the overlapping graphics objects in the direction of depth before the rendering. This determination process is under a heavy load and, as the arbitrary pixels of the frame store are accessed just once, the cache memory is substantially meaningless. For this reason, there is a problem that the cache memory cannot be effectively used.

SUMMARY OF THE INVENTION

The present invention has been made in view of the above conventional examples, and an object thereof is, on forming an image configured by objects, to provide an image forming apparatus and an image forming method for, if a value of a corresponding pixel in an immediately preceding line has the same value, not rendering the pixel but using the pixel value in the immediately preceding line and newly creating a pixel value about a non-identical pixel so as to perform an image forming process at high speed.

Another object is to provide the image forming apparatus and image forming method wherein locality of access to a frame store is conspicuous, a cache can be effectively used and the image forming process is performed at high speed.

To achieve the above-mentioned objects, the present invention has the following configuration.

An image forming apparatus for rendering graphics objects in a frame memory, including:
  a line memory for storing dot image data for each scan line of the graphics objects;
  a deciding unit that decides a position of a differential pixel having different values of corresponding pixels between the scan line stored in the line memory and a target scan line immediately thereafter; and
  a difference updating unit that, of the dot image data stored in the line memory, updates a value of the differential pixel decided by the deciding unit to the value of the pixel in the target scan line.

According to the configuration, on rasterizing the image configured by the graphics objects, it is possible, if the value of the corresponding pixel in the immediately preceding line has the same value, to perform the image forming process at high speed by not rendering the pixel but using a pixel value in the immediately preceding line and newly creating a pixel value about the non-identical pixel.

Furthermore, on rasterizing the graphics objects, the locality of access to the memory storing the dot image data becomes conspicuous and the cache can be effectively used so as to perform the image forming process at high speed.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing an example of a type of information included in the intermediate code of FIG. 3;

DETAILED DESCRIPTION OF THE PREFERRED EMBODIMENTS

First Embodiment

<Configuration of the Image Forming Apparatus>

Figure 2:
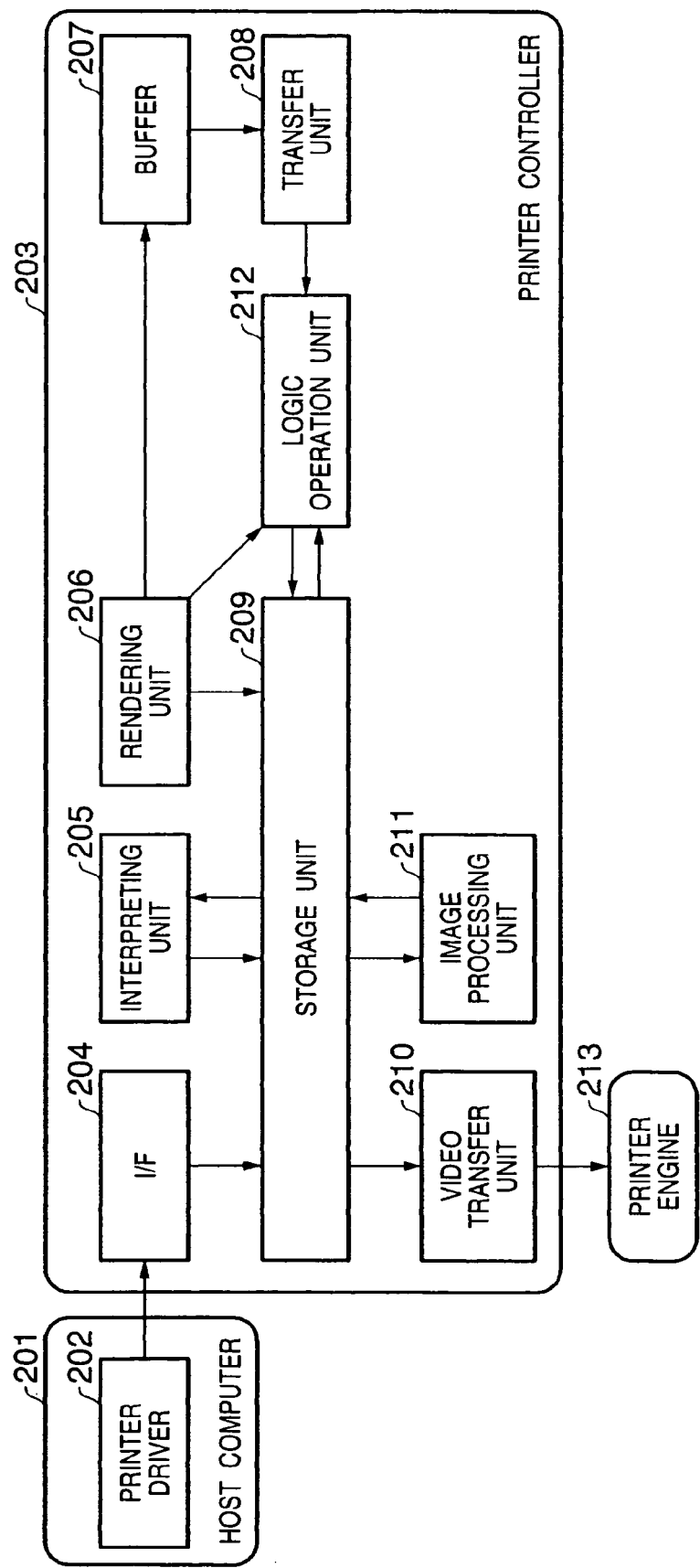
FIG. 2 is an example of a conceptual diagram of a printer controller of a first embodiment according to the present invention.

An embodiment of the present invention will be described by using the drawings. FIG. 2 is a diagram schematically representing a configuration of a printer as an image forming apparatus according to this embodiment. A host computer 201 of FIG. 2 includes a printer driver 202. A printer controller 203 includes an I/F 204, an interpreting unit 205, a rendering unit 206, a buffer 207, a transfer unit 208, a storage unit 209, a video transfer unit 210, an image processing unit 211 and a logic operation unit 212 so as to configure the printer integrally with a printer engine 213. The I/F 204 is connected to the printer driver 202. The storage unit 209 is connected to the I/F 204, interpreting unit 205, rendering unit 206, transfer unit 208, video transfer unit 210 and image processing unit 211. The buffer 207 is connected to the rendering unit 206 and transfer unit 208. The transfer unit 208 is connected to the logic operation unit 212, and the rendering unit 206 is also connected to the logic operation unit 212. The printer engine 213 of FIG. 2 is connected to the video transfer unit 210. The interpreting unit 205, rendering unit 206, image processing unit 211 and logic operation unit 212 can be implemented by executing a predetermined program by means of a CPU of the printer controller 203.

The buffer 207 includes a line memory (line buffer) used when rasterizing a graphics object according to this embodiment. The storage unit 209 includes a frame memory (frame buffer) for storing image data equivalent to one page. When performing banding, the frame memory is used to store the image data in units of a band, and a memory area equivalent to multiple bands is secured. It is also possible to hold the image data in units of a page. It is desirable to provide the line memory and frame memory as separate memory devices. However, they may also be provided in the same memory.

Various kinds of application software not shown operate on the host computer 201. When instructed to perform printing, these applications supply information necessary to generate a bit map image to be printed to the printer driver 202. The printer driver 202 converts the received information necessary to generate the image to print data such as PDL data for instance, and transmits it to the I/F 204 provided to the printer controller 203.

The print data transmitted from the printer controller is held in the storage unit 209 such as the memory once. The print data held in the storage unit 209 is interpreted by the interpreting unit 205 and converted to an interpretable intermediate code by the rendering unit 206 so that the intermediate code is stored in the storage unit 209 again. Details of the intermediate code will be described by referring to FIG. 3 later. The rendering unit 206 reads the intermediate code held in the storage unit 209, and generates a part of a bit map image (dot image data) to be finally outputted on paper by a method described later by referring to FIG. 8A to 8D so as to store it in the buffer 207. The transfer unit 208 transmits the part of the bit map image stored in the buffer to the logic operation unit 212. Here, it should be noted that, even if the part of the bit map image stored in the buffer 207 is transferred by the transfer unit 208, the contents of the buffer 207 are held. The logic operation unit 212 performs a logic operation of the transmitted part of the bit map image by referring to the bit map image stored in the storage unit 209 as required according to an instruction of the rendering unit 206 so as to transfer the bit map image to the storage unit 209.

If the image equivalent to a full page is formed in the storage unit 209 by repeating the above-mentioned process, the image processing unit 211 performs a dither process for instance to the image equivalent to a full page (the image equivalent to one page) stored in the storage unit 209 and stores it in the storage unit 209 again. The video transfer unit 210 transmits the image-processed bit map image equivalent to a full page stored in the storage unit 209 to the printer engine 213. The printer engine 213 prints the transmitted bit map image on a storage medium such as paper. According to this embodiment, the bit map formed in the buffer 207 is configured by color values of R, G and B of 8 bits per pixel respectively.

<Intermediate Code>

Figure 3:
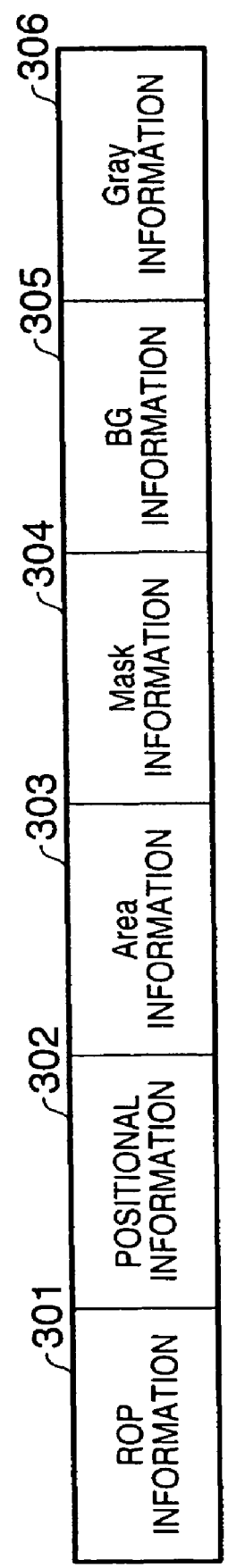
FIG. 3 is an example of an intermediate code of the first embodiment according to the present invention.

Next, the intermediate code generated by the interpreting unit 205 will be described. The intermediate code has at least one graphics object, and represents the bit map for having various figures finally outputted to the storage medium by having multiple graphics objects. FIG. 3 is an example of a data structure of the graphics object included in the intermediate code generated by the interpreting unit 205. Positional information 302 represents a position on the bit map at which the graphics object is rendered. Area information 303 mainly represents a clip area and a simple rectangle. Mask information 304 mainly represents a form of the graphics object. BG (background) information 305 mainly represents a fill pattern. Gray information 306 mainly represents a painted color and raster information. A parameter 301 is a parameter for performing a logic operation of the graphics object rendered based on the area information, mask information, BG information and gray information (collectively called graphics object element information) and a destination for having the graphics object rendered. There are the cases where, depending on the form of the graphics object, all the element information is not necessary. In those cases, it is possible to have the data structure for having no unnecessary information by separately having the information included in the graphics object. It is also possible to give a null value to the unnecessary information.

Figure 4:
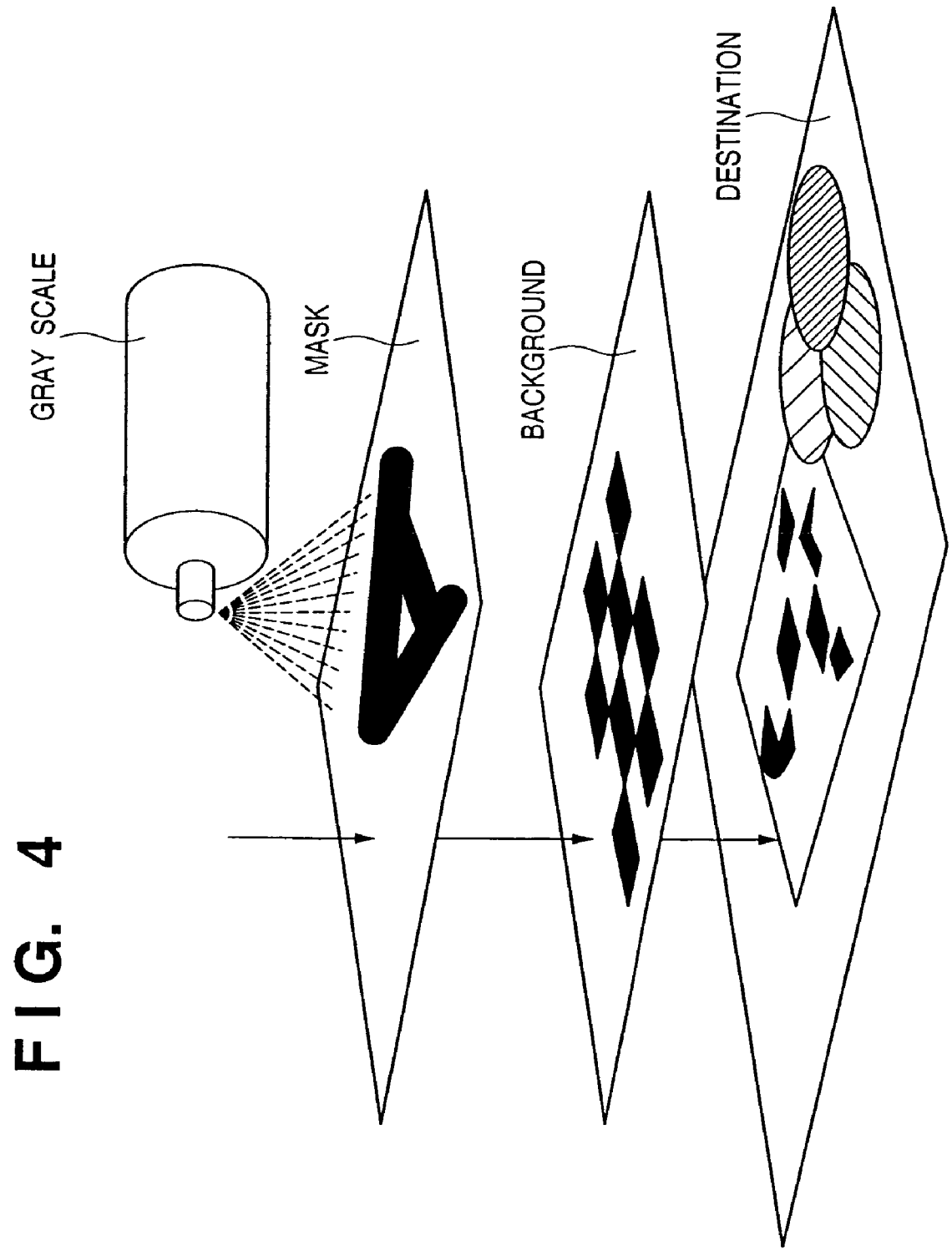
FIG. 4 is a diagram showing an example of a relation of information included in the intermediate code of FIG. 3.

FIG. 4 is a diagram showing an example of a relation of the element information on the graphics object described in FIG. 3. The position and range for rendering the graphics object on a full page is decided by the positional information 302 and area information 303. Candidate pixels to be filled at the position and in the range decided as described above are acquired by the mask information 304. Of the candidate pixels to be filled decided as described above, those not to be filled are masked by the BG information 305 so as to decide the pixels to be filled finally. The color values of the pixels to be filled decided as described above are decided by the gray information 306. FIG. 4 shows the case where the gray information is monochromatic. In the case where the gray information 306 is a raster (that is, not monochromatic), however, it is possible to cope with the case by writing to the destination the color values of the gray information 306 equivalent to the pixels to be filled finally decided as described above. All of them are not always necessary. It is also possible to define the graphics object just by the positional information 302 and area information 303 for defining the position and range and the gray information 306 or BG information 305 for defining the color.

FIG. 5 is a table showing an example of data which the information of FIG. 3 can have and represents the following. The area information is represented as a rectangle, a trapezoid, a run length or a binary bit map. The mask information is represented as a rectangle, a trapezoid, a run length or a binary bit map. The BG information is represented as a pattern, a monochrome or an image. The gray information is represented as a pattern, a monochrome or an image.

Figure 6:
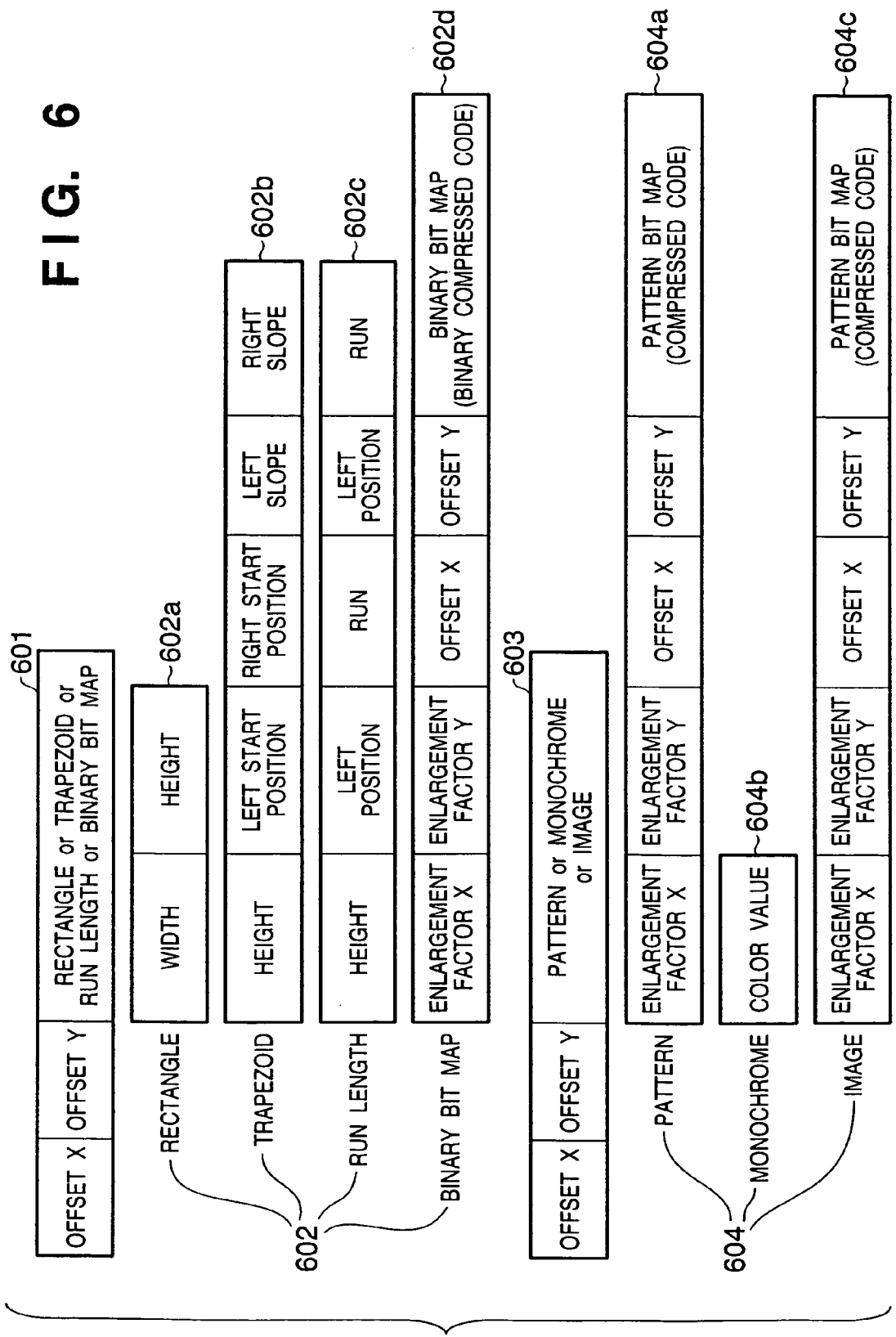
FIG. 6 is an example of the information included in the intermediate code of FIG. 3.

FIG. 6 is a diagram showing an example of the data structure of each of the element information configuring the graphics object described in FIG. 3. According to FIG. 5, the area information 303 and mask information 304 have the structure as indicated by a code 601. The code 601 represents that the area information 303 and mask information 304 are configured by an offset X indicating an X-coordinate of the offset from the positional information 302, an offset Y indicating a Y-coordinate of the offset from the positional information 302 and one of data formats 602 suited to the form of the graphics object to be rendered. The BG information 503 and gray information 504 have the structure as indicated by a code 603. The code 603 represents that the BG information 503 and gray information 504 are configured by the offset X indicating the X-coordinate of the offset from the positional information 302, the offset Y indicating the Y-coordinate of the offset from the positional information 302 and one of data formats 604 suited to the form of the graphics object to be rendered. The bit map or compressed code of a binary bit map 602*d*, a pattern 604*a* and an image 604*d* does not need to be stored inside the graphics object. If the intermediate code includes a pointer or an ID pointing at the bitmap or compressed code, these data may be held outside the graphics object. What each piece of the element information represents is indicated by an identification code for instance. For instance, the contents are identifiable if a code is assigned to each type of objects, for example, the "rectangle," "trapezoid," "run length" and "binary bit map", and embedded at a predetermined position of the area information and mask information.

Each individual parameter of types of objects shown in FIG. 6 will be described. A rectangle object 602*a* has a width and a height as parameters, where the width is the information indicating a length in the scan line direction and the height is the information indicating a length in the direction orthogonal thereto. A trapezoid object 602b has a height, a left start position, a right start position, a left slope and a right slope as parameters. The left start position is represented by an offset in a direction X (scan line direction) with a base point at a position having a leftmost position on an upper side deviated by offsets X, Y from the position defined by positional information 501. The right start position is represented by a rightmost position on the upper side likewise. The left slope can also be considered as a value representing inclination of a left side by the number of pixels indicating a shift length equivalent to the left side between adjacent scan lines. The right slope is also the same about a right side.

A run length object 602c has the height and repetition of a left position and a run as parameters. The height represents the height of a finally rendered object (the number of lines for instance). The pattern for being rendered consists of the left position on each line and the run of which base point is the left position. According to this embodiment, there is one run per line. Therefore, sets of the left position and run from a second set onward are equivalent to the lines from a second line onward respectively.

The binary bit map object 602d has a horizontal enlargement factor X, a vertical enlargement factor Y, the offsets X, Y and binary bit map (or compressed code) as parameters. The enlargement factor indicates a factor for enlarging the binary bit map as to each direction.

The pattern 604a and image 604c have the same parameters as the binary bit map 602d. A monochrome 604b has only a value indicating the color.

Figure 7:
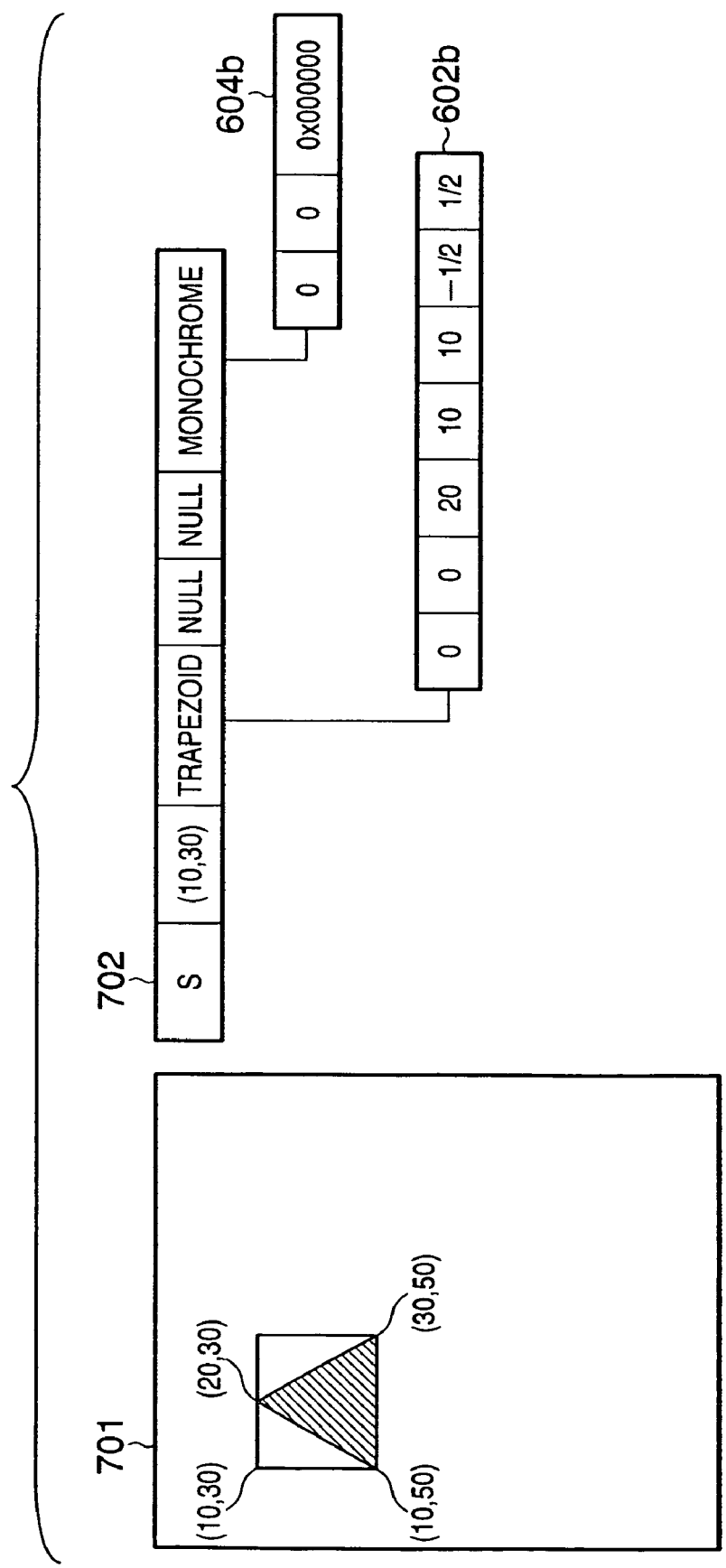
FIG. 7 is a diagram showing an example of the intermediate code of the first embodiment according to the present invention.

FIG. 7 is a simple example of the above-mentioned graphics object. An intermediate code 702 represents the graphics object. A bit map image 701 is rendered based on the intermediate code 702. The graphics object of this example can have the form and color thereof specified by means of the area information and gray information, and so the null is specified as to unused mask information and BG information in the example of FIG. 7. To represent the graphics object, area information 601 is rendered as the trapezoid object 602b. As the graphics object of this example is filled by a color value 0x000000, 0x000000 is specified as gray information 604b. The destination is overwritten in this example, and so "S" indicating overwriting of the destination is specified as ROP information.

In the example of FIG. 7, the intermediate code 702 of the graphics object has (10, 30) as the positional information 702b, "trapezoid" as the area information 702c, and monochrome as the gray information 702d specified therein. Both the mask information and BG information are null and unused. As for the parameter of the trapezoid object 602b, the two "0"s at its head are offsets and its form is represented by "20, 10, 10, –½, ½." These values signify the height, left start position, right start position, left slope and right slope, respectively, from the head. The left start position and right start position are relative positions as to the direction X from the position indicated by the positional information 501. They are both 10 in FIG. 7, and they both become the positions (20, 30) by adding 10 to the start positions (10, 30) in the direction X so as to be matching. The left slope and right slope indicate the inclinations of the left side and right side of the trapezoid by the number of pixels deviated by one line. In FIG. 7, the left slope is –½ indicating that, as against a pixel position equivalent to the left side in a certain scan line, the position of the left side is deviated by ½ pixel to the left in the scan line immediately below it (the sign indicates the direction). It is the same about the right side. However, the sign is "+" and so the direction of deviation is rightward. In the case of actually rendering the trapezoid (it is a triangle because the left start point and right start point are matching), the deviation of ½ pixel cannot be represented. Therefore, the position of the left side or right side is deviated to the left or to the right by one pixel for every two scan lines. A graphics object 701 of FIG. 7 shows a rendered example.

<Operation of the Rendering Unit 206 (FIGS. 8A to 8D)>

FIGS. 8A to 8D are flowcharts for describing the operation of the rendering unit 206. In this example, the buffer 207 stores bit map data having the object rasterized therein in units of the scan line. For that reason, as to different scan lines, the pixels at corresponding positions are stored at the same memory location. For instance, the pixels belonging to the same column on the image are stored at the same location (that is, cells of the same address) in the buffer 207. The above-mentioned intermediate code is stored page by page in the storage unit 209.

Figure 8A:
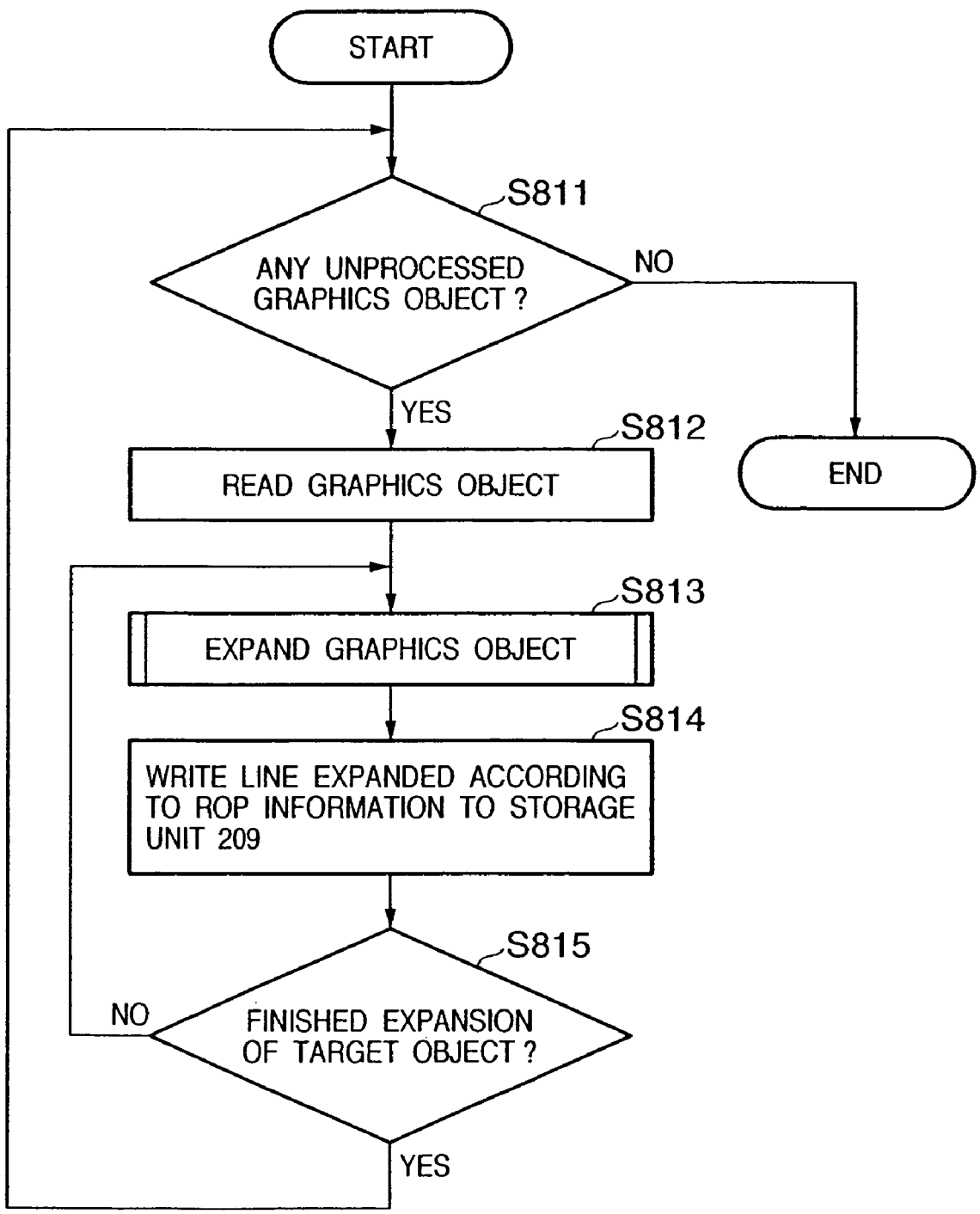
FIG. 8A is a flowchart for describing an example of an image forming process of the first embodiment according to the present invention.

In FIG. 8A, the rendering unit 206 determines whether or not there is an unprocessed graphics object included in the page to be processed (S811). If there is an unprocessed graphics object, it reads the intermediate code from the storage unit 209 in units of the graphics object (S812). The rendering unit 206 rasterizes (expands) the read graphics object (called a target graphics object), and stores the expanded bit map data in the buffer 207 (S813). One scan line of the graphics object stored in the buffer 207 is read by the transfer unit 208, and is transferred to the logic operation unit 212. The logic operation unit 212 reads the color value equivalent to the scan line from the storage unit 209 if necessary according to the information set up in S802 of FIG. 8B so as to perform the logic operation and store it in the storage unit 209. In this case, the storage unit 209 already has the address for storing the scan line transferred from the transfer unit 208. To be more specific, the rasterized bit map data is synthesized in the frame buffer of the storage unit 209 according to ROP information (S814).

It determines whether or not expansion of the graphics object read in the step S812 is finished (S815). If not finished, it returns to the step S813 to continue the expansion process. To be more specific, if the scan line of the buffer 207 is read by the transfer unit 208, the rendering unit 206 forms a subsequent scan line in the buffer 207 by the above-mentioned method. The above-mentioned process is performed to all the scan lines of the graphics object so that the bit map of the graphics object is formed in the storage unit 209. It returns to the step S811 on finishing the expansion of the target graphics object.

Figure 8B:
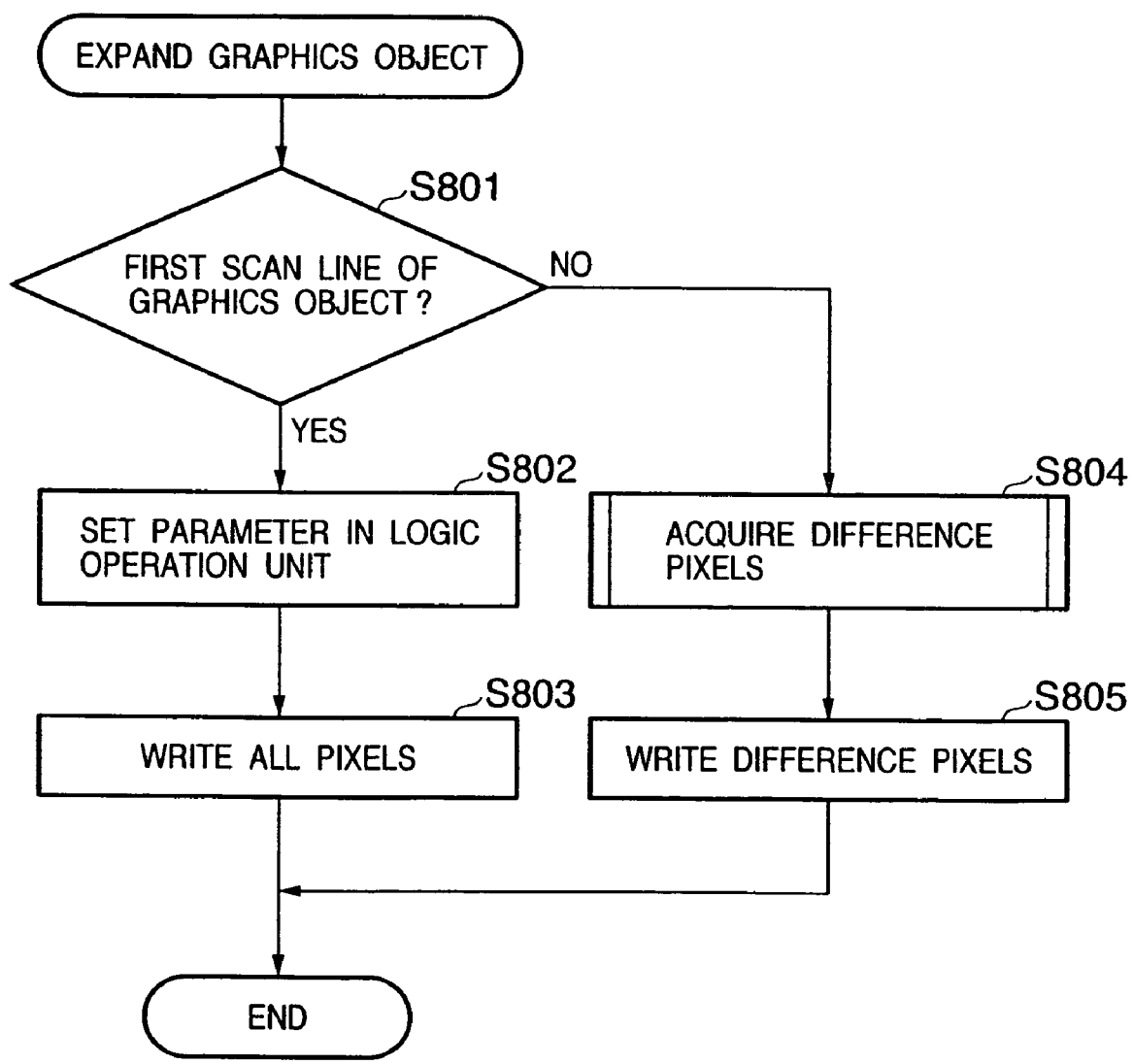
FIG. 8B is a flowchart for describing an example of the image forming process of the first embodiment according to the present invention.

FIG. 8B shows the details of the step S813. The rendering unit 206 first examines whether or not the scan line to be rendered in the buffer 207 is a first scan line of the read graphics object (S801). If it is the first scan line, the rendering unit 206 sets in the logic operation unit 212 the information for transmitting to the storage unit 209 the bit map image received by the logic operation unit 212 from the transfer unit 208, that is, the address or logic operation parameter according to this embodiment (S802). In addition, variable parameters and so on to be referred to in the step S804 are also initialized here. For instance, this includes the initialization of a scan line number and a differential buffer described later and left edge coordinate and right edge coordinate variables to be referred to in the case where the graphics object is a trapezoid. The left edge coordinate and right edge coordinate are initialized to the values equivalent to the left start point and right start point of the parameters of the trapezoid.

Subsequently, it outputs all the pixels configuring the first scan line of the graphics object to the buffer 207 (S803). If determined not to be the first scan line in the step S801, it acquires a differential pixel of mutually corresponding pixels (pixels at the same position) as to the scan line just outputted to the buffer 207 and the scan line to be outputted this time (called a target scan line) (S804). Subsequently, it outputs the value of the differential pixel acquired in the step S804 (S805). Here, the buffer 207 has the raster information (dot image data) on the scan line immediately before the target scan line remaining therein. For that reason, complete raster information on the target scan line is held in the buffer 207 by outputting only the differential pixel. The pixel value is the value provided in the gray information or BG information. According to this embodiment, in the case where the gray information or BG information is an image or a pattern, all the pixels of one line are the difference pixels so that the process in this case is substantially the same as the step S803. Therefore, only the difference pixels are outputted in the case where the gray information or BG information is monochrome, and so the outputted value may be the value provided in the gray information or BG information itself.

As described above, the rendering unit 206 generates from the intermediate code a part of the bit map image, that is, one scan line of the graphics object according to this embodiment.

Figure 8C:
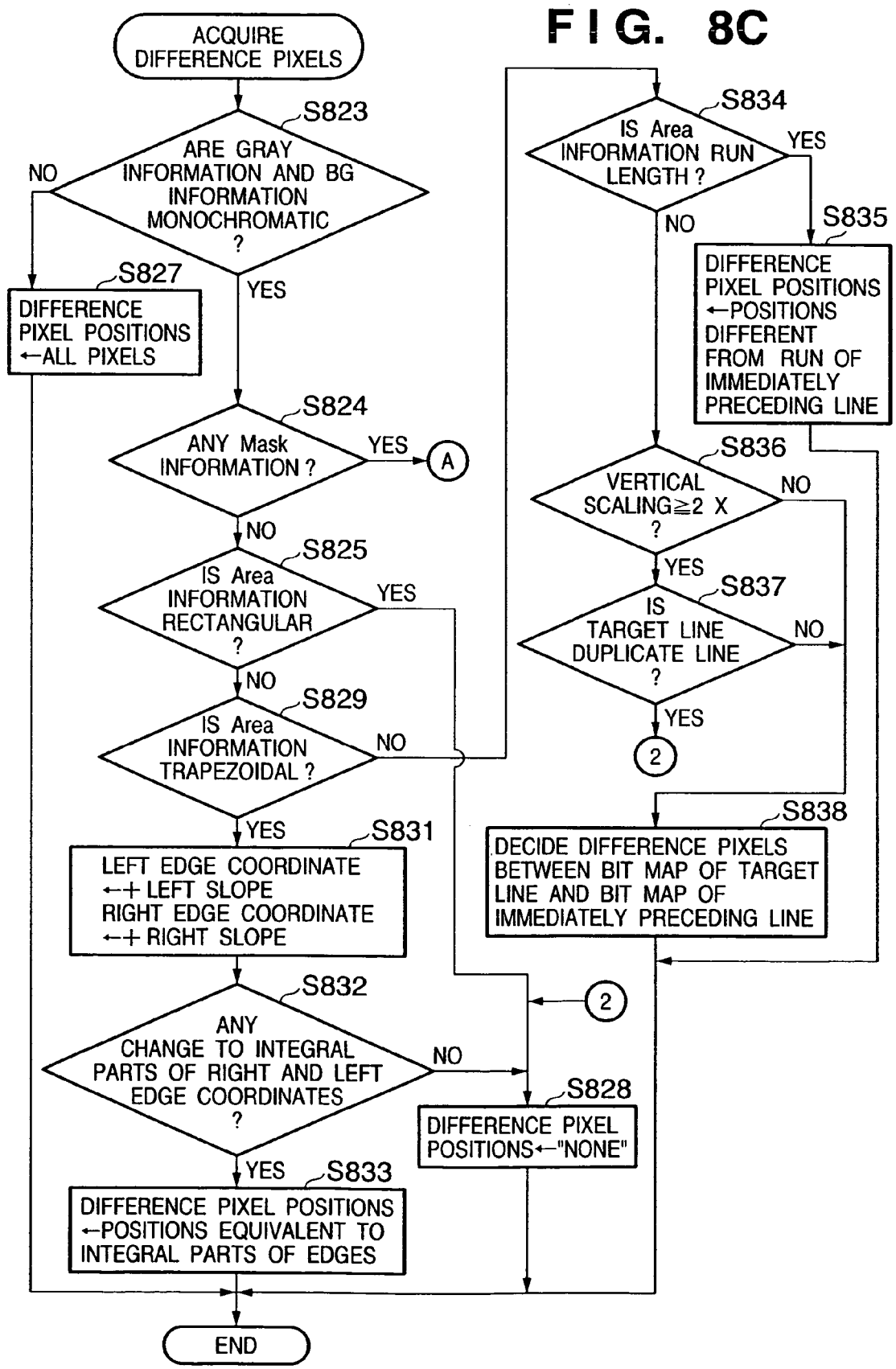
FIG. 8C is a flowchart for describing an example of the image forming process of the first embodiment according to the present invention.
Figure 8D:
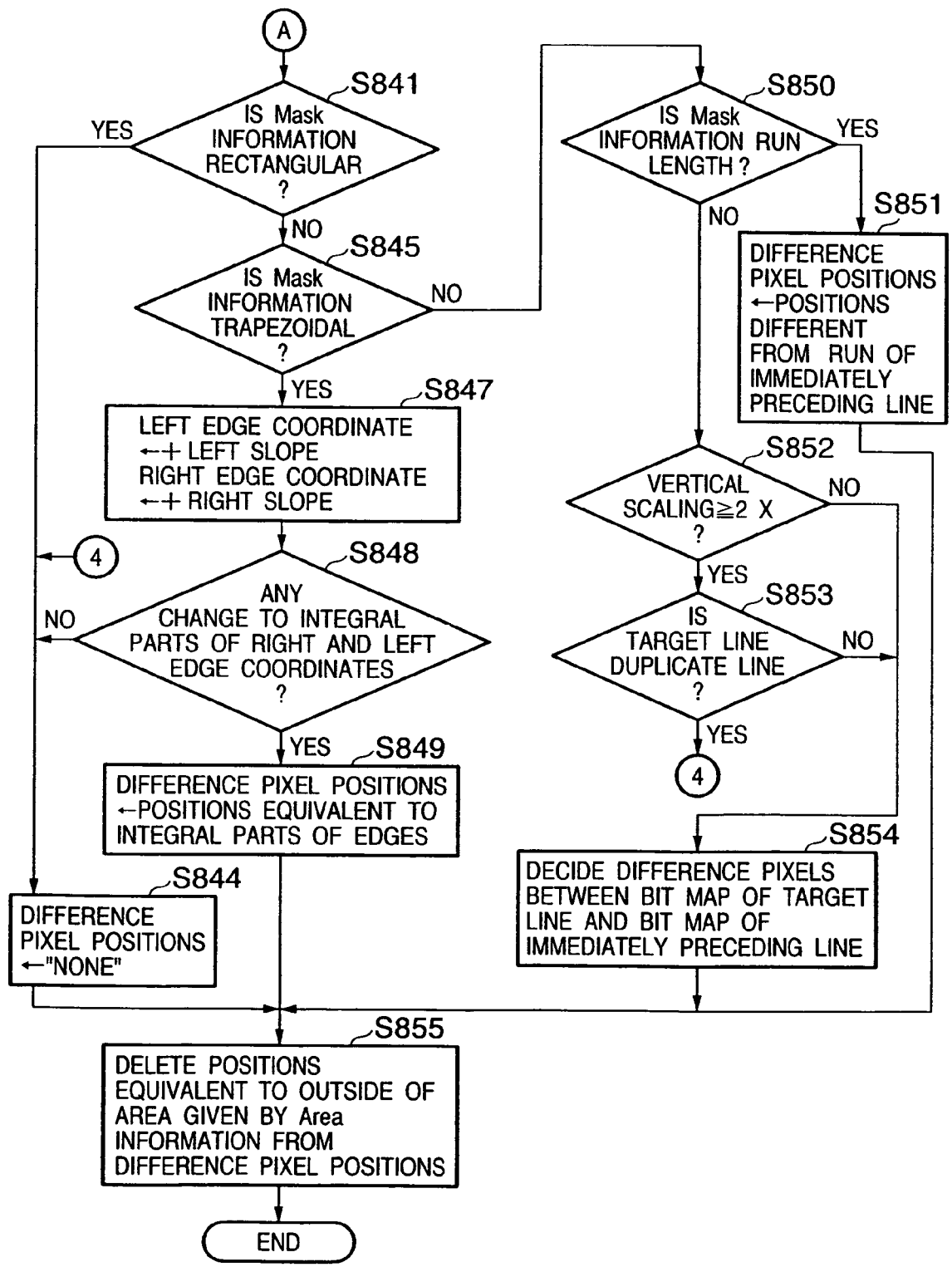
FIG. 8D is a flowchart for describing an example of the image forming process of the first embodiment according to the present invention.

FIGS. 8C to 8D are flowcharts showing the details of the step S804. It is mainly executed by the rendering unit 206. These flowcharts use a memory area called the differential buffer. The differential buffer is the area provided to the storage unit 209, and is used to store the information on the positions of the difference pixels if there are the difference pixels and the information indicating that there are no difference pixels if there are none. The number of the target scan line (the head is 0) is stored in the storage unit 209 to be referred to. This is called a target scan line number, and is also referred to in the following description as required.

First, it is determined if neither the gray information 504 nor the BG information 503 is null and both of them are monochromatic (S823). If neither null nor monochromatic, they are either the patterns or images. They are the information in which color value distribution is defined by the patterns or images, where the difference pixels cannot be decided unless corresponding pixels are mutually compared between adjacent lines. Therefore, if neither the gray information 504 nor the BG information 503 is monochromatic, all the pixels of the target line are recorded in the differential buffer in the step S827 (the information indicating that all the pixels are the difference pixels may be recorded for instance). In the case where the value of either the gray information 504 or the BG information 503 is undefined (null), only the information which is not null is to be determined.

If determined as YES in the step S823, the gray information 504 and the BG information 503 are either null or monochromatic. In that case, it is determined whether or not there is mask information 502, that is, whether or not null (S824). If the mask information 502 is null, it is determined if the area information 501 is the "rectangle" 602a (S825). If determined as the "rectangle" 602a in the step S825, it is recorded that there is no differential pixel in the differential buffer (S828). This is because the pixel to be rendered is the same from the first line to the last line in the case of the rectangle. This embodiment describes the case where the offset is 0, and so there is no need to calculate a difference. In the case of rendering a rectangle of offset Y=1 and height 3 for instance, differences arise between a line 1 (upper side of the rectangle) and a line 4 (line next to the base of the rectangle) when the scan line starts from 0 so that the upper side and base become the differential pixel positions.

If determined that the area information 501 is not the rectangle in the step S825, it is determined if the area information 501 is the "trapezoid" 602b (S829). If it is the trapezoid, the values of the left slope and right slope are added to the left edge coordinate variable and right edge coordinate variable initialized in the step S802 respectively (S831). And it is determined if there is a change to the values of integral parts of the left edge coordinate variable and right edge coordinate variable respectively (S832). For this purpose, the values immediately before being added in the step S831 should be temporarily stored. If one of them changes, it means that the pixels to be rendered have changed between the target scan line and the scan line immediately preceding it. Therefore, the positions equivalent to the integral parts of the variables are recorded as the positions of the difference pixels in the differential buffer (S833). If none of them changes, it branches to a step S828 considering that there is no change to the edge position. The positions of the difference pixels are different depending on whether the change of the variable is an increase or a decrease. In the case of an increase, each of the values after the increase is equivalent to the differential pixel. If it increases from 5 to 7 for instance, 6 and 7 after the increase are the difference pixels. In the case of a decrease, the value before the decrease is equivalent to the differential pixel. If it decreases from 7 to 5 for instance, 6 and 7 before the decrease are the difference pixels. The positions of the difference pixels are thus decided.

If determined that the area information is not the trapezoid in the step S829, it is determined whether or not the area information is the run length (S834). In the case of the run length, deviated positions (all the deviated ones) are recorded as the positions of the difference pixels in the differential buffer based on positional deviations of the start position (left position) and end position (decided by the left position and run length) of the run between the target scan line and the scan line immediately preceding it (S835). This embodiment described the case where the offset is 0. In the case of rendering a rectangle of offset Y=1 and height 3 for instance, differences arise between a line 1 (upper side of the rectangle) and a line 4 (line next to the base of the rectangle) when the scan line starts from 0 so that the upper side and base become the differential pixel positions.

If determined not to be the run length in the step S834, the object is a binary bit map. In that case, it is determined if a scaling factor of 2 or more is specified by referring to a parameter of the enlargement factor Y (S836). If not so specified, it branches to the step S827 and records the information that all the pixels are the difference pixels in the differential buffer. If the scaling factor of 2 or more is specified, it is determined if the target scan line is a line to be duplicated (S837). If the enlargement factor is 2 for instance, an even-numbered line is a duplication of the line immediately before it. In that case, it branches to the step S828 and stores the information that there is no differential pixel in the differential buffer (S828). If not a duplicate line, the difference pixels of the bit map of the target scan line and the bit map of the scan line immediately before it are decided (S838). The difference pixels are the pixels other than those resulting in 0 when calculating an exclusive OR of the bit map of the target scan line (obtained from the parameter of the binary bit map) and the scan line immediately before it (stored in the buffer 207). As a matter of course, the calculation is performed correspondingly to the positions of the pixels. The positions of the difference pixels are recorded in the differential buffer. In this case, it is not necessary to examine the differences after enlarging the area information. For instance, it is also possible, instead of using the value of the buffer 207, to take the exclusive OR with a value representing continuous scan lines of the binary bit map of the area information and multiply this calculation result by the enlargement factor so as to determine the pixel subsequently equivalent to a location at which a bit is on as the differential pixel.

To determine whether or not it is the duplicate line in the step S837, the following may be performed in the case where the enlargement factor Y is a variable N and the target scan line number of the target graphics object is a variable n (a lead line is 0). To be more specific, it is determined whether or not a modulo enlargement factor N residue of the scan line number n is 0, and it can be determined to be the duplicate line if not 0. This is because vertical enlargement is implemented by duplication of the line.

It branches to a step S841 shown in FIG. 8D if determined that there is the mask information in the step S824. As for the steps S841 to S854, the same processes as the steps S825 to S838 shown in FIG. 8C is performed respectively except that the area information is replaced by the mask information. Thus, a description of each step will be omitted. In FIG. 8D, the difference pixels at the positions equivalent to the outside of the area defined by the area information are deleted from the differential buffer lastly in a step S855. This is because, even in the area defined by the mask information, there can be the pixels defined to be outside the area defined by the area information.

<Concrete Example of the Rendering 1>

The image forming apparatus of this embodiment will be described by taking a concrete example. In this example, a detailed description will be given as to the operation wherein the intermediate code representing the graphics object shown in FIG. 7 is stored in the storage unit 209, and the graphics object is rendered by the rendering unit 206.

The rendering unit 206 reads the intermediate code representing the graphics object stored in the storage unit 209. The rendering unit 206 reads ROP information 301 and the positional information 302 described in the intermediate code, and further examines whether or not the read intermediate code has the area information 303, mask information 304, BG information 305 and gray information 306 set up therein, that is, whether or not the null value. From this result and the ROP information 301 described in the intermediate code, it decides the logic operation parameter with the destination so as to transfer the logic operation parameter with the destination thus decided and the positional information 302 to the logic operation unit 212.

The rendering unit 206 subsequently writes the first scan line of the graphics object to the buffer 207 based on the information described in the intermediate code which is not the null value. In this case, the scan line to be written to the buffer 207 is formed so as to be correctly transferred to the storage unit 209 when transferred from the head of the buffer 207 to the address of the storage unit 209 calculated by the logic operation unit 212 described later. In this example, as the mask information and BG information are null, the X-coordinate of a right edge and X-coordinate of a left edge configuring the trapezoid are calculated from the area information. And a maximum X-coordinate of the right edge of the graphics object is calculated so as to write the raster information to the buffer 207 according to the gray information, that is, the monochrome (0x000000 in this example). To be more specific, in this example, the maximum X-coordinate of the right edge is 20, and the X-coordinate of the left edge of the first scan line is 10 while the X-coordinate of the right edge is 10. Therefore, a color value equivalent to white such as 0xffffff is written to 0 to 9 and 11 to 19 of the buffer 207, and 0x000000 is written to 10 of the buffer 207. In this example, a maximum value of the right edge coordinate of the trapezoid is calculated by the rendering unit 206. It is also possible, however, to list the minimum and maximum coordinates of the graphics object in the intermediate code in advance.

The transfer unit 208 subsequently reads the raster equivalent to a size written to the buffer 207 and transfers it to the logic operation unit 212. The logic operation unit 212 examines the logic operation parameter (that is, determines which logic operation parameter it is) transferred in advance from the rendering unit 206, and checks whether or not it is necessary to read the raster information already stored in the storage unit 209. If determined to read the raster information (sequence of bit maps) above, it acquires the address of the storage unit 209 for reading the raster information from the positional information transferred from the rendering unit 206 in advance, reads the raster information from the address, performs the logic operation of this and the raster information transferred from the transfer unit 208 and stores the raster information as a result of the logic operation at the address. In the case of holding the bit map equivalent to a full page (one page) in the storage unit 209, the frame buffer is stored in the storage unit 209. In that case, the address of the storage unit 209 for reading the raster information is calculated by adding the positional information to a lead address of the frame buffer. In the case of holding a band bit map having divided the paper like bands in the storage unit 209, a band buffer is held in the storage unit 209. In that case, the address can be acquired by adding the positional information to the lead address of the band buffer. In this example, "S" is specified as the logic operation parameter. Therefore, there is no need to read the already stored raster information from the storage unit 209, and the raster information transferred from the transfer unit 208 is transferred to the address of the storage unit 209.

On finishing storage into the storage unit 209, the logic operation unit 212 updates the above-mentioned address in preparation for the transfer of the scan line to follow. When the transfer unit 208 completes reading of the rater from the buffer 207, the rendering unit 206 forms a subsequent scan line in the buffer 207. In this case, the rendering unit 206 updates only the pixels having differences between corresponding pixels of the preceding scan line and subsequent scan line (refer to FIGS. 8C and 8D). To be more specific, in terms of all the information stored in the intermediate code, it decides the pixels mutually having the differences as to the pixels equivalent to the corresponding pixels of the scan line before the target scan line and the subsequent target scan line respectively. It fills the pixels stored in the buffer 207 equivalent to the pixels thus decided. In this example, there can be the differences only in the area information between the respective corresponding pixels of the preceding scan line and the subsequent target scan line. The pixels having the differences in the area information are determined from the right edge coordinate, left edge coordinate, right slope and left slope in the preceding scan line. The case where the edge coordinates are astride the pixels in this example will be described. As for the left edge, if the edge coordinate is smaller than a central coordinate of the pixel, the pixel is generated by determining the pixel to be inside the graphics object. As for the right edge, if the edge coordinate exceeds the central coordinate of the pixel, the pixel is generated to be inside the graphics object. For that reason, the left edge coordinate is 10 and the right edge coordinate is 10 in the second scan line so that there is no pixel having the difference. For that reason, the buffer 207 keeps holding the raster information of the preceding scan line as-is. And the raster information is transferred to the transfer unit 208 and also transferred to the logic operation unit 212 to be stored in the storage unit 209 thereafter as with the above-mentioned first scan line.

Subsequently, a third scan line is formed in the buffer 207 by the same method as described above. In this example, the left edge coordinate and right edge coordinate in the third scan line are 9 and 1.1 respectively. The differences arise to the pixels of a coordinate 9 and a coordinate 11 in the buffer 207 as to the equivalent pixels of the second scan line and third scan line respectively. Therefore, the rendering unit 206 fills the ninth and eleventh pixels from the left with the color value equivalent to white such as 0xffffff first, and subsequently fills the pixels between the edges of the trapezoid with the gray information, that is, 0x000000. The reason for filling with the color value equivalent to white is to cope with the case where the left edge has an edge growth direction to the right and the case where the right edge has an edge growth direction to the left. It is also possible, by checking whether the edge is the right edge or the left edge in advance, to omit the process of filling it with the color value equivalent to white in the case where the left edge has an edge growth direction to the left and the case where the right edge has an edge growth direction to the right. The processes described above are repeated at the height of the graphics object, that is, height 20 of the trapezoid in this example so as to form the bit map of the graphics object equivalent to the intermediate code read by the rendering unit 206 in the storage unit 209.

Figure 9:
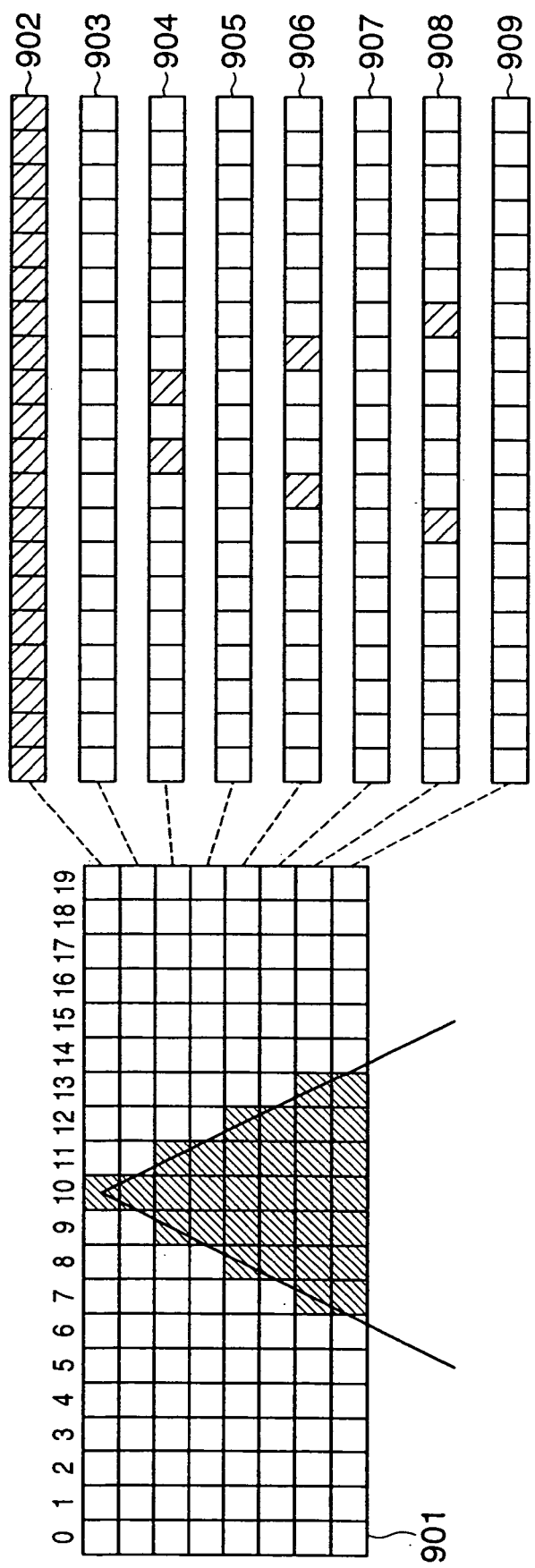
FIG. 9 is a diagram showing an example of the pixels having differences in corresponding pixels respectively in the scan line of continuous graphics objects.

FIG. 9 is a diagram showing formation of the above-mentioned graphics object. An area 901 is a diagram showing eight lines from a lead scan line of the graphics object. Lines 902 to 909 show the pixels to be filled (that is, to be generated) in each scan line. As the line 902 is the lead scan line, it is necessary to generate all the pixels. As the lines 903, 905, 907 and 909 have no difference pixels, the rendering unit 206 performs no writing to the buffer 207 as to the scan lines equivalent thereto. As for the scan lines 904, 906 and 908, the rendering unit 206 performs writing only for the filled pixels. In FIG. 9, 20×8=160 pixels are shown. However, it is possible, by this method, to generate the bit map by filling 26 pixels.

<Concrete Example of the Rendering 2>

Figure 10:
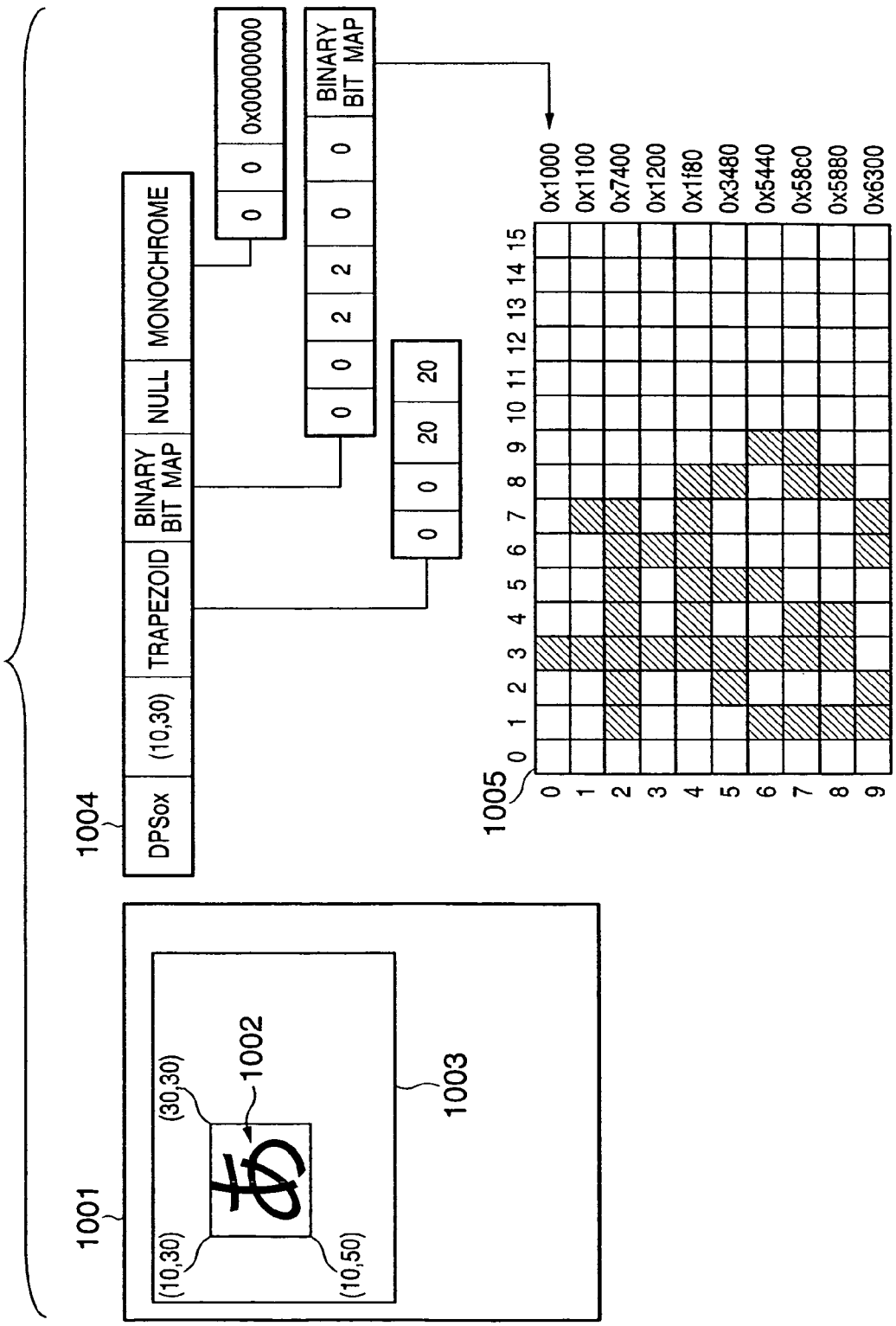
FIG. 10 is a diagram showing an example of the intermediate code of the first embodiment according to the present invention.

Next, a description will be given as to the case where the graphics object shown in FIG. 10 is formed by the rendering unit 206. Reference numeral 1001 denotes a bit map having a rectangle 1003 and a bit map font 1002 overlapping the rectangle 1003, where the intermediate code representing the bit map font 1002 is as indicated by reference numeral 1004. The color value of the bit map font 1002 is decided by calculating the color value and exclusive OR of each corresponding pixel of the rectangle 1003. The intermediate code indicating the graphics object of the rectangle 1003 and a rendering method thereof are easily understandable from the above description, and so no description thereof will be given. As for 1004, the ROP information is "DPSox" indicating that a color is decided by calculating the color value and exclusive OR of each pixel of the corresponding destination, the positional information indicates that the graphics object is to be written to the X-coordinate 10, Y-coordinate 30 of the page, the area information is a rectangle of width 20 and height 20, the mask information is a binary bit map, the BG information is a null value, and the gray information is a monochrome. As for the font, there are the cases where the bit map configuring the font is stored in a font cache. According to this embodiment, a value indicating a font cache ID is stored in the intermediate code, the bit map configuring the font is stored in the font cache, and the binary bit map indicated by reference numeral 1005 is stored in the font cache. The value listed on the right side of each scan line of the binary bit map represents the scan line by the value, indicating that each scan line is represented by 16 bits. The binary bit map of the mask information has 0 specified to both X and Y as the offset. This indicates that the bit map is formed from the coordinates (0, 0) on the upper left of the bit map indicated by reference numeral 1003. The binary bit map of the mask information has 2 specified to both the enlargement factors X and Y. This indicates that the bit map is formed by doubling the bit map indicated by 1003 vertically and horizontally.

If the intermediate code 1004 is read to the rendering unit 206, the rendering unit 206 determines a logical relation between the graphics object and the destination indicated by the intermediate code indicated by 1004. In this example, the logical relation between the graphics object and the destination is "X" indicating the exclusive OR because it is specified by the ROP information that each pixel of the graphics object and the destination take the exclusive OR. The logical relation acquired as above and the positional information are transmitted to the logic operation unit 212. The rendering unit 206 subsequently reads the information included in the intermediate code, and writes the first scan line of the graphics object to the buffer 207. In this example, the area information is a clip, and so the pixel not included in the clip has the color value equivalent to white such as 0xffffff written thereto. The pixel included in the clip and having a corresponding bit of the mask information on has the color value according to the gray information, that is, 0x000000 written thereto. In this example, 2 is specified as the enlargement factor X of the binary bit map. Therefore, 0 to 5 and 8 to 19 of the buffer 207 are filled by the color value equivalent to white, that is, 0xffffff. And 6 to 7 are filled by the color value equivalent to the gray information, that is, 0x000000.

Subsequently, the raster information stored in the buffer 207 is read to the transfer unit 208 and transmitted to the logic operation unit 212. The logic operation unit 212 has "X" specified in advance as the logic operation parameter with the destination by the rendering unit 206. Therefore, the logic operation unit 212 reads the color value from a transfer destination of the raster information in the storage unit 209, and calculates the exclusive OR of this and the raster information so as to store it in the storage unit 209 again. If the raster information stored in the buffer 207 is read from the transfer unit 208, a subsequent scan line is formed in the buffer 207. In this example, there is no change to the area information and gray information from the lead scan line to the end scan line of the graphics object. And the mask information has 2 specified as the enlargement factor Y so that there is no difference in the color value of the respective corresponding pixels of the above scan lines as to the even-numbered scan lines of this graphics object (that is, the scan lines which are n mod N≠0 described in FIG. 8D). For this reason, as for the even-numbered scan lines, the raster information is transferred to the transfer unit 208 without change in the contents of the buffer 207.

As for the scan lines other than the lead and even-numbered scan lines, the differences between the scan lines of the mask information are checked, and the pixels of the buffer 207 equivalent to the pixels having the differences are filled. In this case, it is not necessary to check the differences after enlarging the mask information. The exclusive OR of the mask information should be taken by the values representing the continuous scan lines of the binary bit map of the mask information for instance, and the calculation result should be multiplied by the enlargement factor so as to consequently determine the pixels equivalent to the points where the bit is on to be the difference pixels.

As the above process is repeated until the end scan line of the graphics object, the graphics object represented by the intermediate code 1004 is formed in the storage unit 209.

Figure 11:
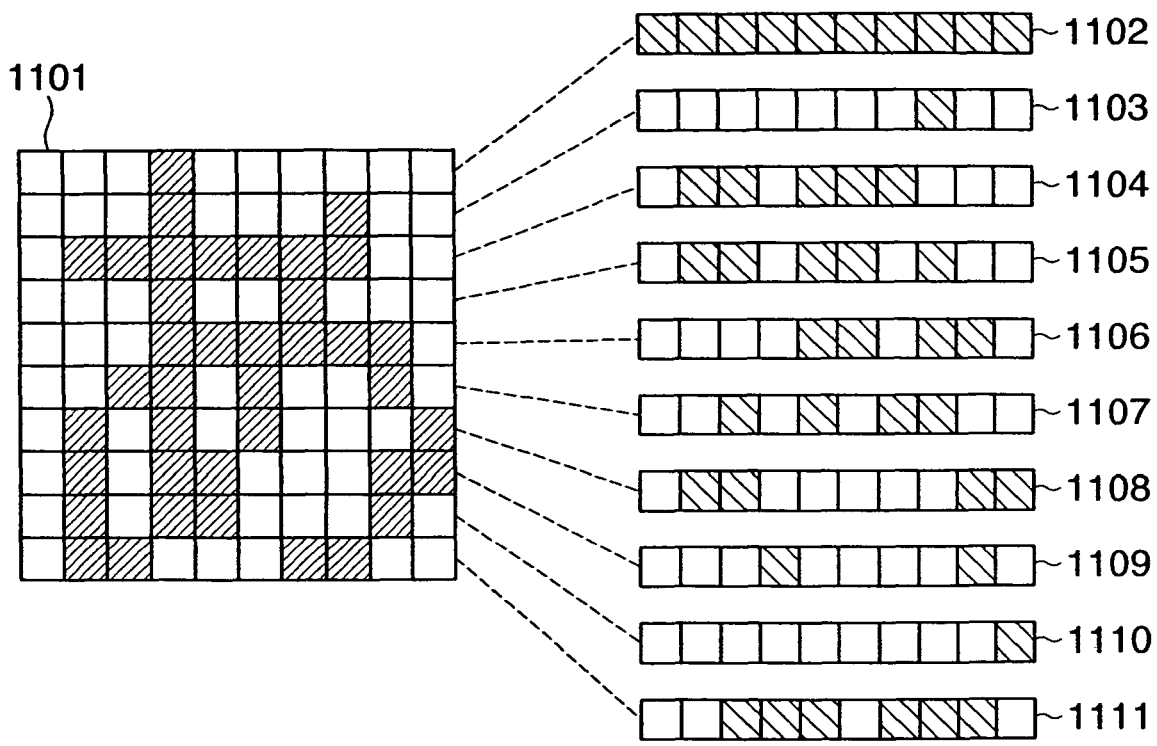
FIG. 11 is a diagram showing an example of the pixels having differences in corresponding pixels respectively in the scan line of continuous graphics objects.

FIG. 11 is a diagram showing the difference pixels of the respective corresponding pixels in the continuous scan line of the mask information of the intermediate code 1004, where mask information 1101 is the mask information having the area information applied thereto, and difference information 1102 to 1111 indicates the difference information from the line immediately above. As for the lead scan line (1102), however, all the pixels have the differences. The difference pixels are determinable by taking the exclusive OR in the continuous scan lines as described above. To be more precise, it is possible to acquire the difference pixels of the respective corresponding pixels of the first scan line and subsequent scan line by means of the exclusive OR (represented by XOR) of the corresponding pixels of the adjacent line, such as (0×1000) XOR (0×1100)=0×0100 for instance. In this example, the width of the binary bit map is 16 bits. However, it is possible, as for the bit map having a larger width, to acquire the difference information by using the same approach as the one described above by calculating the exclusive OR in units of 32 bits or 16 bits for instance from the head.

Figure 12:
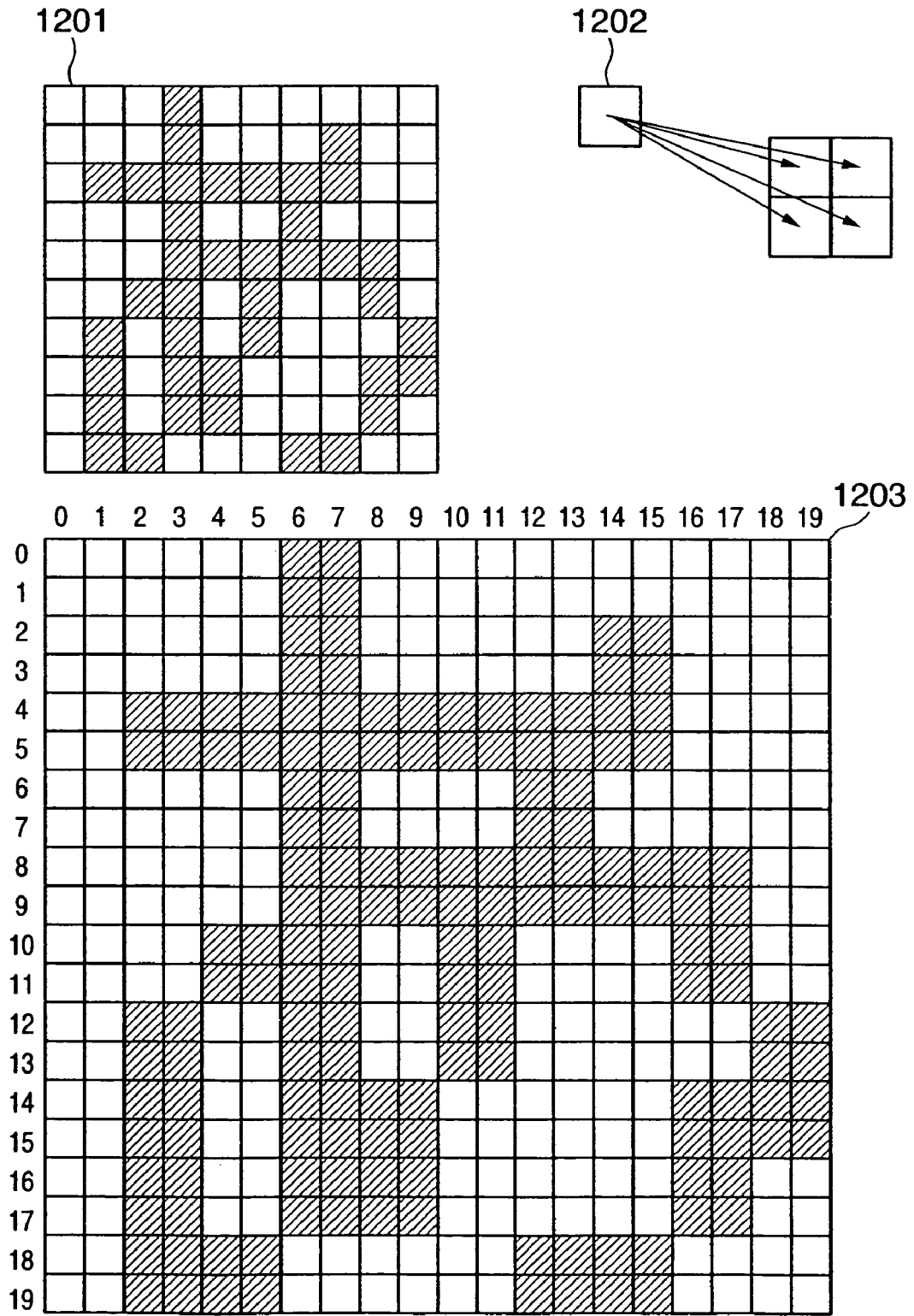
FIG. 12 is a diagram for describing enlargement of a bit map image according to the present invention.

FIG. 12 is a diagram showing the state of having enlarged the mask information of the intermediate code 1004, where a bit map 1201 is the binary bit map before the enlargement, a mapping 1202 is a diagram for describing the method of enlarging the pixel, and a bit map 1203 shows the binary bit map having enlarged the bit map 1201. When enlarging it by twice vertically and horizontally, it is possible to do so by generating the pixels so that arbitrary one pixels are arranged two by two vertically and horizontally as shown in the mapping 1202.

<Concrete Example of the Rendering 3>

Figure 13:
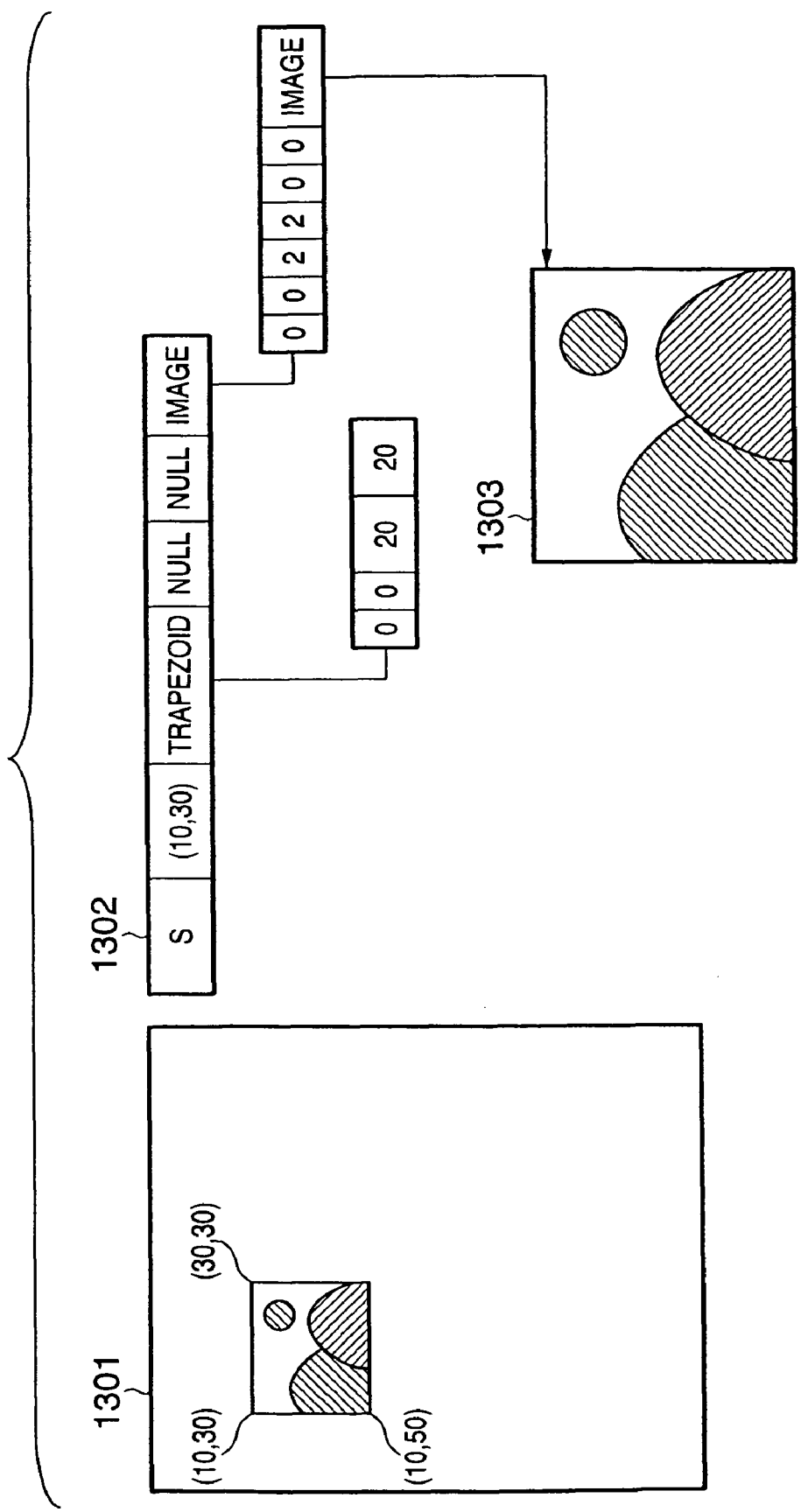
FIG. 13 is a diagram showing an example of the intermediate code of the first embodiment according to the present invention.

Next, a description will be given as to the case where the intermediate code representing the graphics object shown in FIG. 13 is formed by the rendering unit 206. Reference numeral 1301 denotes a bit map to be generated. An intermediate code 1302 has the rectangle for the clip as the area information. There are no mask information and BG information. It has the image as the gray information, where the image is a bit map 1303. In the case where the gray information or the BG information is the bit map, it is a heavy load to calculate difference positions of the respective corresponding pixels in the continuous scan lines of the bit map. For this reason, this embodiment considers that all the pixels have the differences in the case where the gray information or the BG information is the bit map. To be more specific, the image is outputted to the buffer 207 while enlarging it in the direction X as required. Enlargement in the direction Y can be implemented by selectively controlling whether or not to write to the buffer 207 according to the enlargement factor in the direction Y as previously described. Thus, it is possible to switch the method of acquiring the differences according to an attribute of the intermediate code so as to flexibly cope with the cases where it is difficult to acquire the differences or the load is high.

It is desirable, according to the present invention, that the buffer 207 and the storage unit 209 be separate devices. However, the present invention is also applicable in the case of the same device. According to this embodiment, the pixel of the bit map to be formed is RGB 24 bits. It goes without saying, however, that the pixel may be in another color representation such as a CMYK format, a YCC format or a monochromatic format.

As described above, when rendering the graphics object by lines, this embodiment performs re-rendering limited to the corresponding pixels (difference pixels) having different values between adjacent lines under certain conditions so as to realize higher efficiency of the rendering process. As for the graphics object wherein the BG information and gray information include an inclusive definition of the color value such as the image and pattern, the entire scan lines to be rendered are considered as the difference pixels and re-rendered. Thus, in the case where the load of the process for deciding (positions of) the difference pixels is highly likely to become heavier, it is possible to realize an efficient rendering process by omitting the process of deciding the difference pixels.

Second Embodiment

Another embodiment according to the present invention will be described. This embodiment will omit a description of those described in the first embodiment. Components not directly related to the present invention are omitted in the drawings.

As for an image forming method of the rendering unit 206, there are the cases where, as a graphics object having trouble with processing speed such as an image of which enlargement factor in the direction Y is 1 has the image formed in the buffer 207 and then transferred to the storage unit 209, the processing speed becomes slower than a conventional rendering method if the rendering is performed by the method of the first embodiment. For this reason, it is desirable, as a method, to switch between the conventional rendering method and the rendering method according to the present invention as to each graphics object. The second embodiment will describe the configuration for realizing this.

Figure 14:
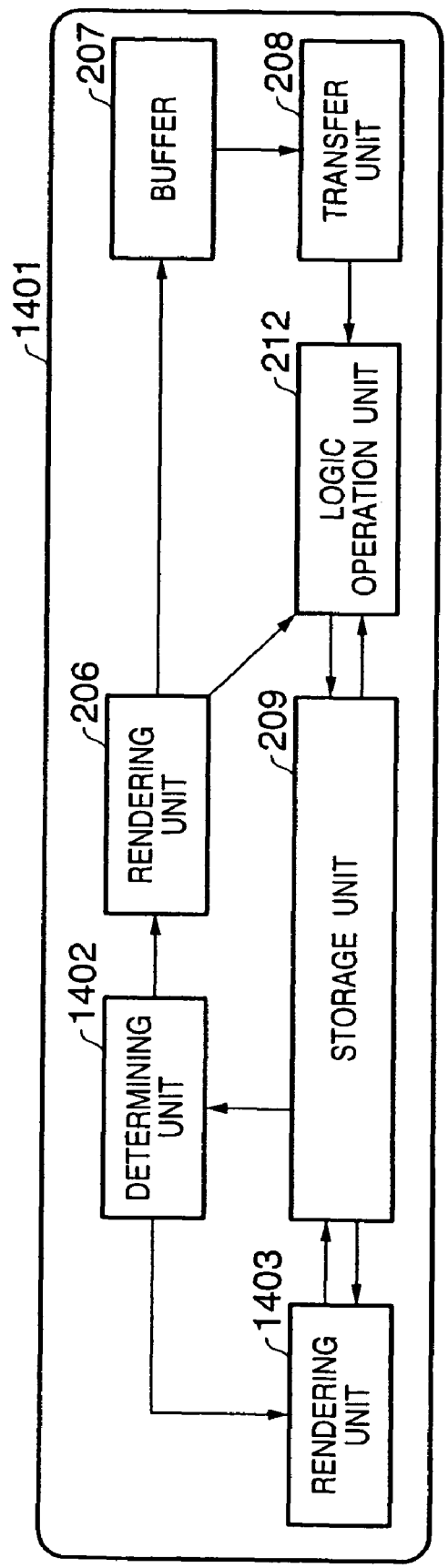
FIG. 14 is an example of a conceptual diagram of the printer controller of a second embodiment according to the present invention.

FIG. 14 is a diagram showing an example of the printer controller for switching between the conventional rendering method and the rendering method according to the present invention, meeting the requirement. A printer controller 1401 is equivalent to the printer controller 203 described in the first embodiment. A rendering unit 1403 is equivalent to the rendering unit 206 described in the first embodiment, and renders the graphics object by using a procedure of FIG. 8B to FIG. 8D. In addition, there are the buffer 207, transfer unit 208, logic rendering unit 212 and storage unit 209. It also has the I/F 204, interpreting unit 205, image processing unit 211 and video transfer unit 210 of FIG. 2 although not shown. The rendering unit 1403 is a conventional rendering unit for rendering the graphics object by using a conventional procedure. This procedure decides the values of all the pixels of the object in order of the raster. A determining unit 1402 allocates the intermediate code to the rendering unit 206 or the rendering unit 1403 according to the intermediate code held in the storage unit 209. The rendering unit 1403 is connected to the storage unit 209.

The intermediate code described in the first embodiment keeps compatibility with the intermediate code of the conventional rendering method. For this reason, the determining unit 1402 transfers the intermediate code to the rendering unit 1403 or the rendering unit 206 according to an attribute of the graphics object so as to switch between the conventional rendering method and the rendering method according to the present invention. If the gray information is the image and the enlargement factor in the direction Y is 1, the determining unit 1402 transfers the read intermediate code to the rendering unit 1403 and performs the rendering process by using the conventional procedure. If the gray information is the image and the enlargement factor in the direction Y is other than 1, it transfers the intermediate code to the rendering unit 206 to have the rendering process of FIGS. 8B to 8D of the first embodiment performed by the rendering unit 206.

This determination is made immediately after the step S812 of FIG. 8A, and it branches to the step S813 if the gray information is the image and the enlargement factor in the direction Y is 1 as to the target graphics object. If not, the target graphics object is rendered by using the conventional procedure. Thus, it is possible, by switching the rendering method according to the attribute of the intermediate code, to realize the printer controller having its processing speed further improved.

Third Embodiment

Figure 21:
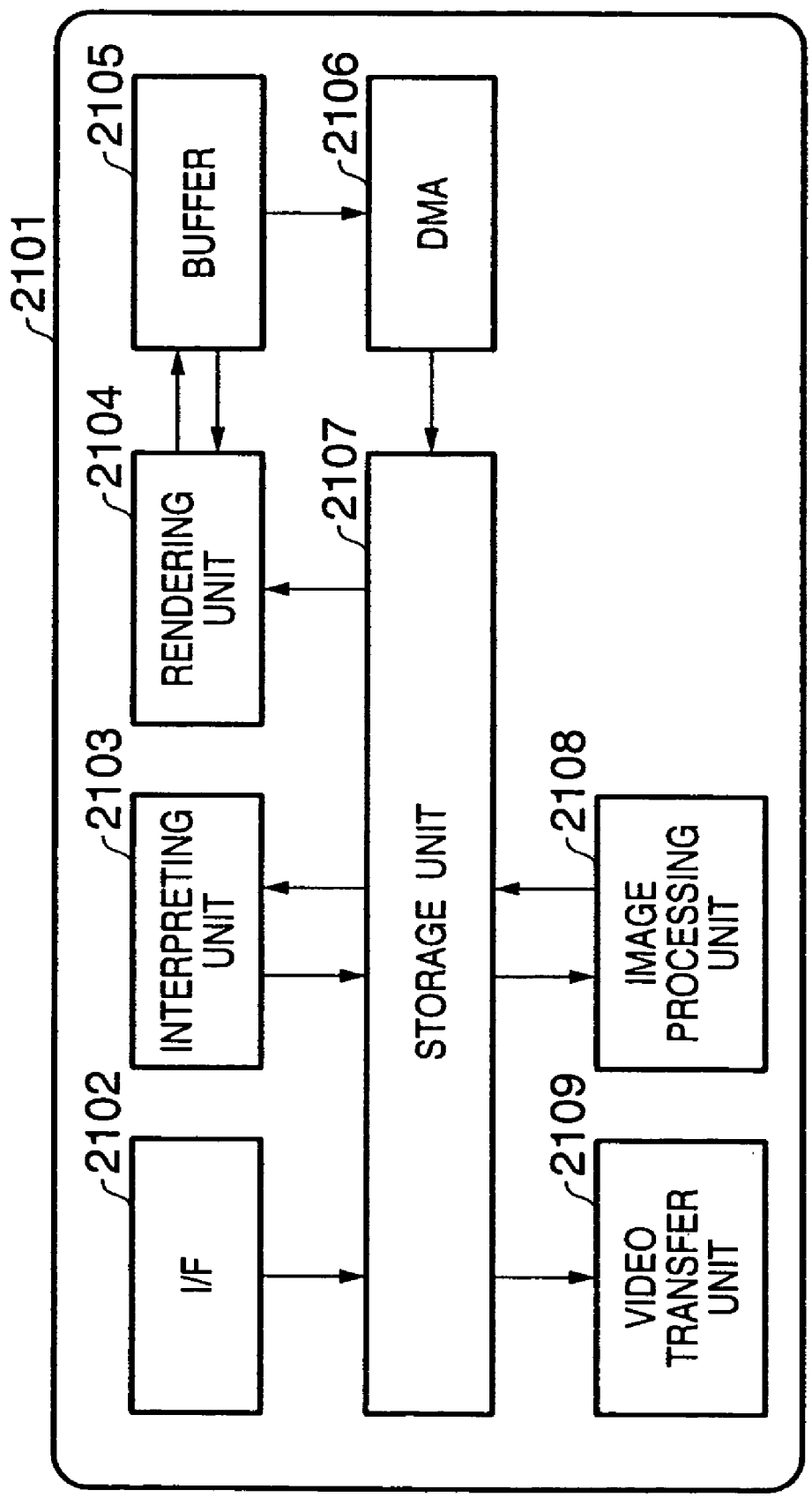
FIG. 21 is an example of a conceptual diagram of the printer controller of the third embodiment according to the present invention.

Next, a third embodiment of the present invention will be described by using the drawings. FIG. 21 is a conceptual diagram of the printer controller for implementing the image forming method of this embodiment. Reference numeral 2101 denotes the printer controller. An interface 2102 receives the print data from an unshown external host and stores it in a storage unit 2107. An interpreting unit 2103 interprets the print data stored in the storage unit 2107 and generates the intermediate code described later so as to store it in the storage unit 2107. A rendering unit 2104 reads the intermediate code stored in the storage unit 2107 and forms an image for each scan line in a buffer 2105. The buffer 2105 can hold at least the scan lines of the bit map to be formed. A DMA 2106 transmits a scan line image formed in the buffer 2105 to the storage unit 2107. The storage unit 2107 is a memory for instance. An image processing unit 2108 performs image processing to the bit map stored in the storage unit 2107. A video transfer unit 2109 transfers the image having undergone the image processing in the image processing unit 2108 to the printer engine not shown. The storage unit 2107 is connected to the I/F 2102, interpreting unit 2103, rendering unit 2104, DMA 2106, image processing unit 2108 and video transfer unit 2109. The buffer 2105 is connected to the rendering unit 2104 and DMA 2106.

Next, the image forming method of this embodiment will be described by using the drawings. The print data transmitted from the host computer not shown is stored in the storage unit 2107 by the I/F 2102. The print data stored in the storage unit 2107 is interpreted by the interpreting unit 2103 according to the flowchart of FIG. 16 to be converted to the intermediate code. The operation of the interpreting unit 2103 will be described later. The print data is configured by multiple graphics objects. The graphics objects are normally transferred in order from the one placed at the depth of the bit map to be rendered. According to this embodiment, the print data stored in the storage unit 2107 is stored by keeping the order in the depth direction of the bit map to be rendered. The intermediate code converted from the print data by the interpreting unit 2103 is stored in the storage unit 2107. The intermediate code stored in the storage unit 2107 as described above is read to the rendering unit 2104. The rendering unit 2104 forms the raster of the scan lines in the buffer 2105 according to the intermediate code. The operation of the rendering unit 2104 will be described later. The raster of the scan lines formed in the buffer 2105 as described above is transferred to a preset address of the storage unit 2107 by the DMA 2106. If the DMA 2106 finishes the transfer, the DMA updates a transfer destination address of the storage unit 2107 in preparation for the transfer of the subsequent scan line by incrementing a transferred rasterizing address for instance. Even if the raster of the buffer 2105 is read by the DMA 2106, the buffer 2105 holds that raster information. If the DMA 2106 finishes the transfer of the raster, the rendering unit 2104 forms the subsequent scan line in the buffer 2105. Hereunder, the above-mentioned process is repeated to all the scan lines of the bit map formed in the storage unit 2107 so that a full-page bit map is formed in the storage unit 2107. If the bit map is formed in the storage unit 2107, the image processing unit 2108 converts an image data format to be able to transfer it to the printer engine not shown, and stores the converted bit map in the storage unit 2107. The video transfer unit 2109 reads the bit map converted by the image processing unit and transfers the bit map to the external printer engine not shown so that the printer engine prints the received bit map on the page.

According to this embodiment, the image equivalent to one page is formed in the storage unit 2107. It is also possible, however, to process each of the areas dividing the page like bands. In this case, the band buffer should be prepared in the storage unit 2107, and the DMA 2106 should transmit the raster equivalent to a predetermined band height to the storage unit 2107 and then initialize a transfer destination address.

<Intermediate Code Format>

Figure 15:
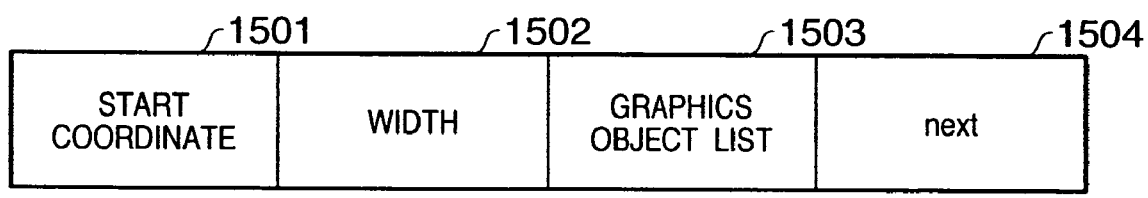
FIG. 15 is an example of the intermediate code of a third embodiment according to the present invention.

FIG. 15 shows an example of elements configuring the intermediate code converted from the print data in the interpreting unit 2103. Hereunder, the elements configuring the intermediate code are called a difference list. In FIG. 15, an X-coordinate 1501 is the X-coordinate of the difference pixels which are the pixels equivalent to two continuous scan lines respectively. The number of pieces 1502 is the number of continuous difference pixels. A list 1503 is a list of the graphics objects for filling the difference pixels. A pointer 1504 is a pointer for pointing at the difference list at another position existing in the same scan line. It is possible to specify a parameter indicating that no filling is performed on the list of the graphics objects. This is used, for instance, to erase the pixels rendered in the graphics object in the scan line subsequent to the last scan line of the graphics object. The difference list is formed for each scan line, and null is specified as to the scan line having no difference.

<Intermediate Code Generation Procedure>

Figure 16:
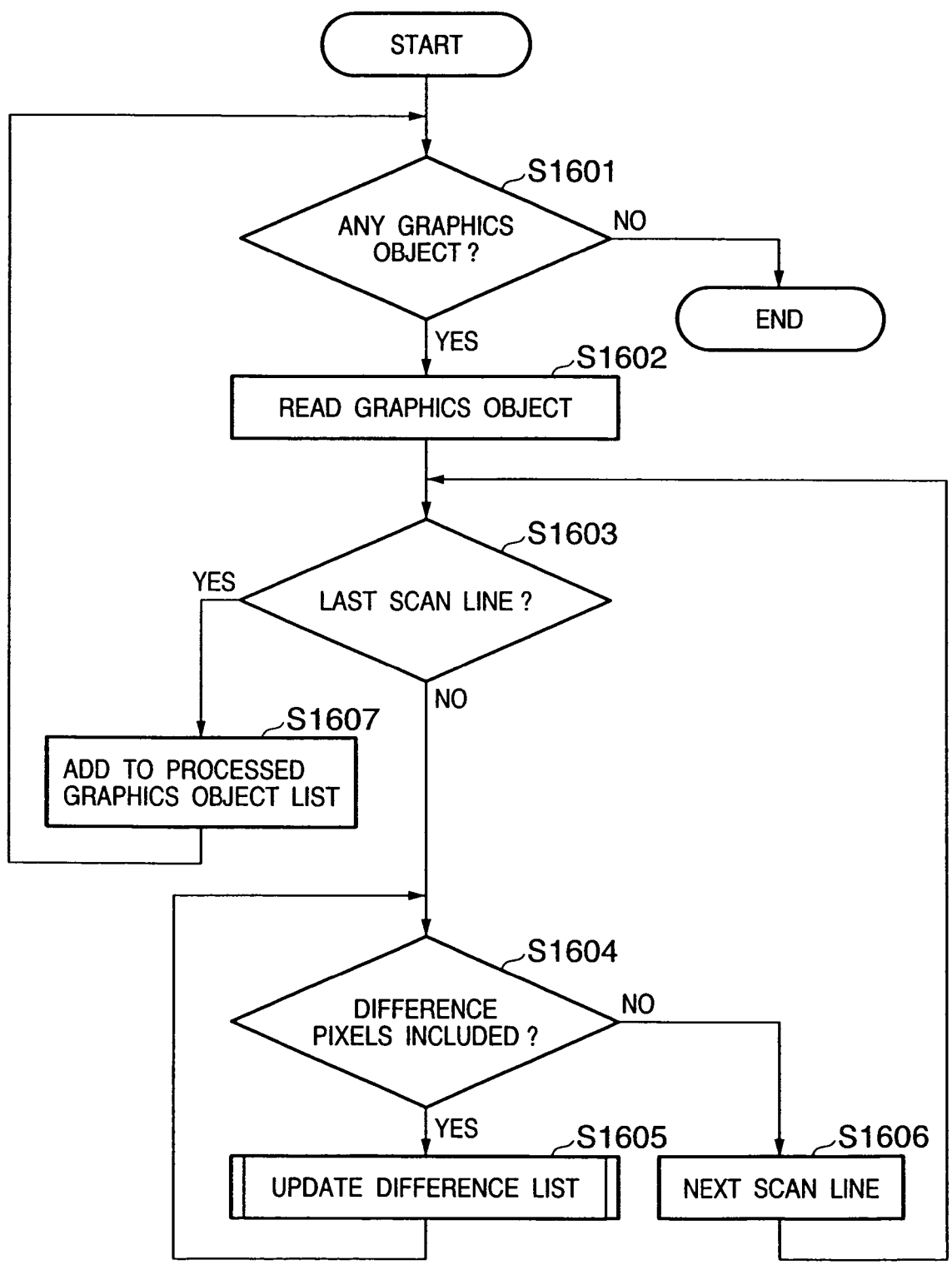
FIG. 16 is a flowchart for describing a process of creating an example of the intermediate code of the third embodiment according to the present invention.

In FIG. 16, the interpreting unit 2103 determines whether or not there is an unprocessed graphics object in the print data stored in the storage unit 2107 (S1601). If there is one, the interpreting unit 2103 reads it in units of a graphics object (S1602). If determined that there is no graphics object to be processed, it finishes the interpreting process. Next, it notes the scan lines in order from the lead scan line of the graphics object, and determines whether or not the target scan line is the last scan line (S1603). This determination can be implemented, for instance, by comparing a "height" parameter included in the parameters of the object to the target scan line number.

If not the last scan line, it searches for the difference pixels which are the corresponding pixels in the target scan line and the immediately preceding scan line respectively (S1604). In the step S1604, it searches for the start position of the difference pixels in the direction X and the number of the continuous difference pixels. If the difference pixels are found, it updates the difference lists created so far or newly creates the difference list according to the flowchart shown in FIG. 17 (S1605). It returns to the step S1604 thereafter, and repeats S1605 to all the difference pixels on the scan line in processing of the graphics object. In the case where there is no difference information to be processed in the step S1604, it moves on to the next scan line in processing of the graphics object (S1606) so as to repeat the above-mentioned process as to all the scan lines of the graphics object. On finishing the processing of the difference pixels as to all the scan lines of the graphics object, it adds the processed graphics object to the end of the processed graphics object list for the sake of updating the difference list described later (S1607), and it returns to the step S1601 so as to repeat the above-mentioned process to the subsequent graphics object.

Figure 17:
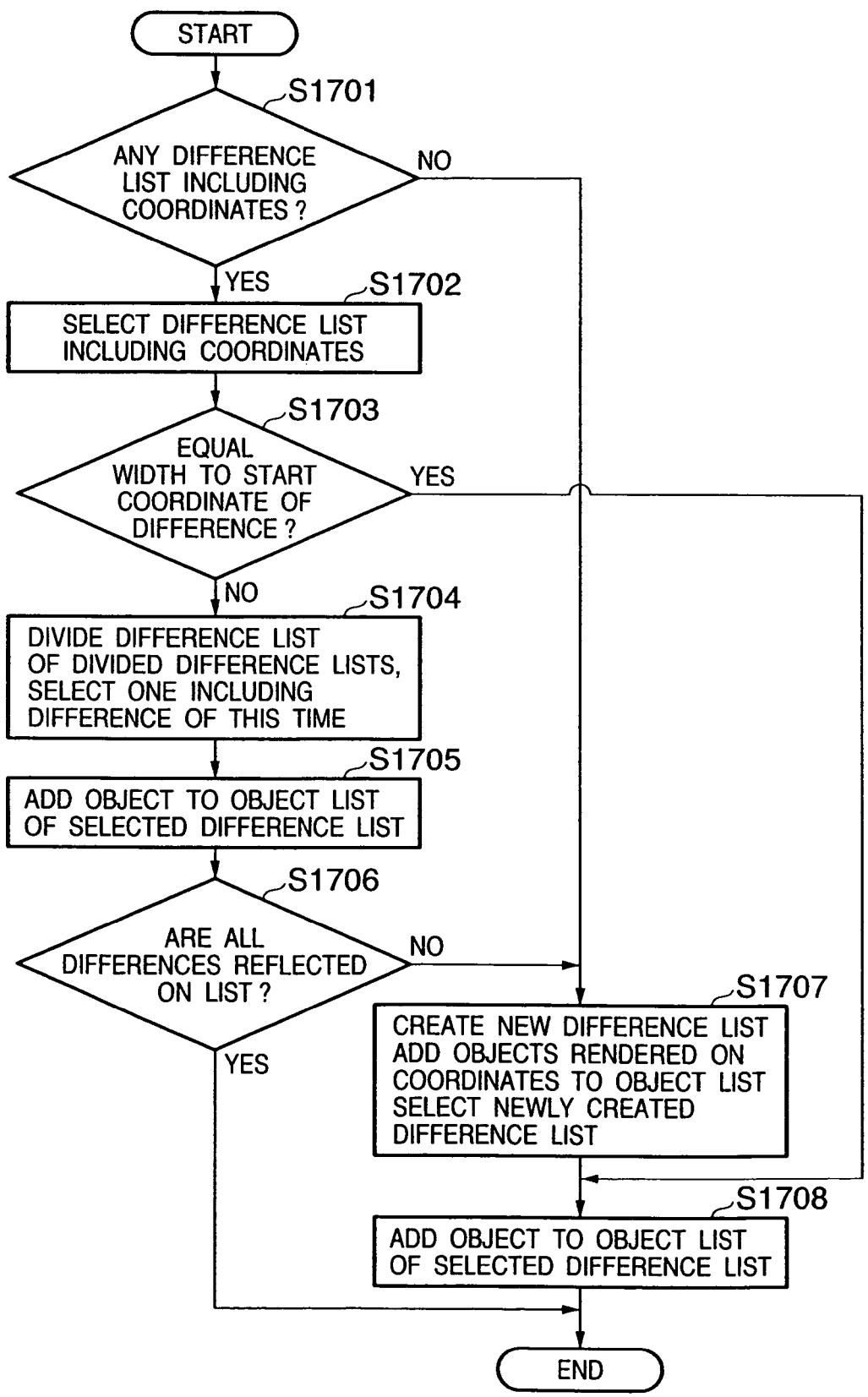
FIG. 17 is a flowchart for describing the process of updating the intermediate code of the third embodiment according to the present invention.

Next, a description is given by using the flowchart of FIG. 17 as to an example of a method of updating or newly creating the difference list in the step S1605. First, it is checked whether the difference list including the difference pixels searched for in the step S1604 of FIG. 16 already exists in the storage unit 2107 (S1701). If it is not found here, it newly creates the difference list and searches for the graphics object to be rendered on the difference pixels searched for in the step S1604 from the head of the processed graphics object list created in the step S1607 of FIG. 16. It registers the graphics object with the graphics object list 1503 as the difference list, and selects the difference list created this time as a subject of the processing (S1707). Thereafter, it adds the graphics object inputted this time (target graphics object) to the graphics object list as the difference list (S1708) so as to finish the process.

In the step S1701, in the case where the difference list including the difference pixels searched for in the step S1604 already exists in the storage unit 2107, it selects the difference list as the subject of processing (S1702). It subsequently checks (determines) whether or not a start coordinate and a width of the difference pixels searched for in the step S1604 of FIG. 16 are equal as to the selected difference list (S1703). If equal, it adds the graphics object inputted this time to the rear of the graphics object list of the selected difference list so as to finish the process (S1708).

If determined not to be equal in the step S1703, it divides the selected difference lists into those including the difference pixel inputted this time and those not including it, and reselects the difference list including the difference of this time (S1704). It subsequently adds the graphics object inputted this time to the rear of the graphics object list of the selected difference list (S1705). It subsequently checks whether or not the positional information described in the selected difference list completely includes the difference pixels inputted this time, that is, whether or not the start position and width of the selected difference list are equal to those inputted this time (S1706). If equal, it finishes the process. If not equal, it newly registers the difference pixels not included in the selected difference list as the difference list (S1707). The processing from S1707 onward is as described above.

Figure 18:
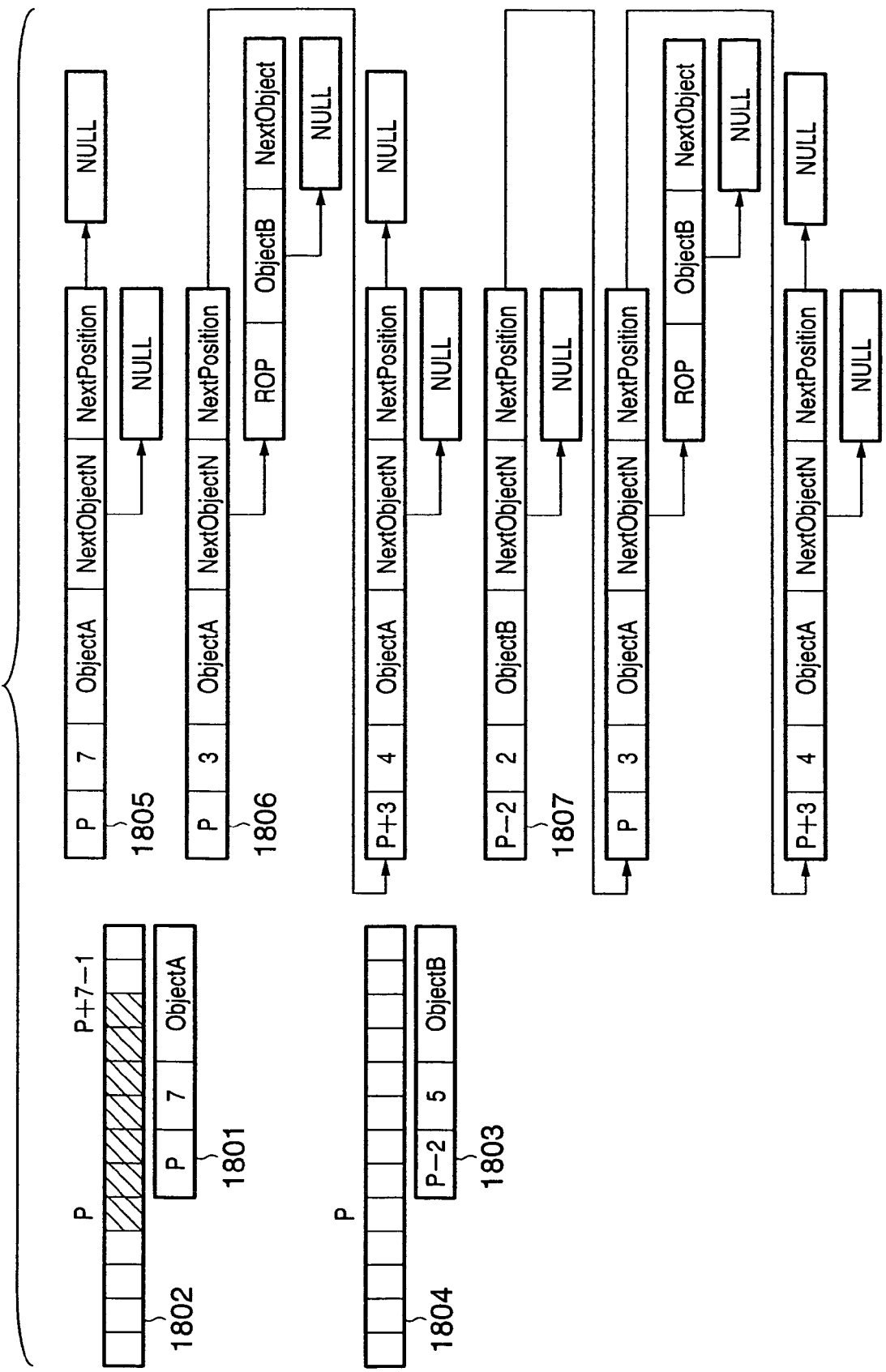
FIG. 18 is an example of the intermediate code for describing the process of updating the intermediate code of the third embodiment according to the present invention.

FIG. 18 is a diagram well representing the above-mentioned update of the difference list. Registered difference information 1801 is an example of the difference information already registered, which includes the position of the difference pixel, length and object identifier thereof. Registered difference information 1802 is a graphic representation of the registered difference information 1801. New difference information 1803 is an example of newly inputted difference information. Difference information 1804 is a graphic representation of the new difference information 1803. The difference information of the registered difference information 1801 is registered as a difference list 1805. If the new difference information 1803 is inputted, the difference list 1805 is divided into two, that is, the one including the difference pixels represented by the new difference information 1803 and the one not including it. This is because the difference pixels represented by the new difference information 1803 are overlapping the area of the difference list 1805. The graphics object corresponding to the new difference information 1803 is added to the graphics object list including the difference pixels. To be more specific, a coordinate "P" to a coordinate "P+2" on the difference list 1805 (that is, a position P, a length 3) include the difference pixels represented by the new difference information 1803 while a coordinate "P+3" to a coordinate "P+6" o (that is, a position P+3, a length 4) include no difference pixel. For that reason, the difference list 1805 is divided into two difference lists as shown in a difference list 1806, that is, a difference list corresponding to the difference pixels of the position P and length 3 and a difference list corresponding to the difference pixels of the position P+3 and length 4. As for the difference pixels represented by the new difference information 1803, a coordinate "P−2" to a coordinate "P−1" are not included in the difference list. Thus, as shown on a difference list 1807 of FIG. 18, a difference list representing the pixels having the differences not included (a position P−2, a length 2) is newly created and linked to the difference list.

The above procedure is used to create for each scan line the list (difference list) as the intermediate code indicating the run of the difference pixel between itself and the scan line immediately preceding it and the object corresponding to the run. The created intermediate code is recorded in the storage unit 2107. Although not described in the example of FIG. 19, the difference list is created for each scan line and so it includes at its head a corresponding line identifier indicating which scan line the difference list corresponds to.

<Scan Line Generation>

Figure 20:
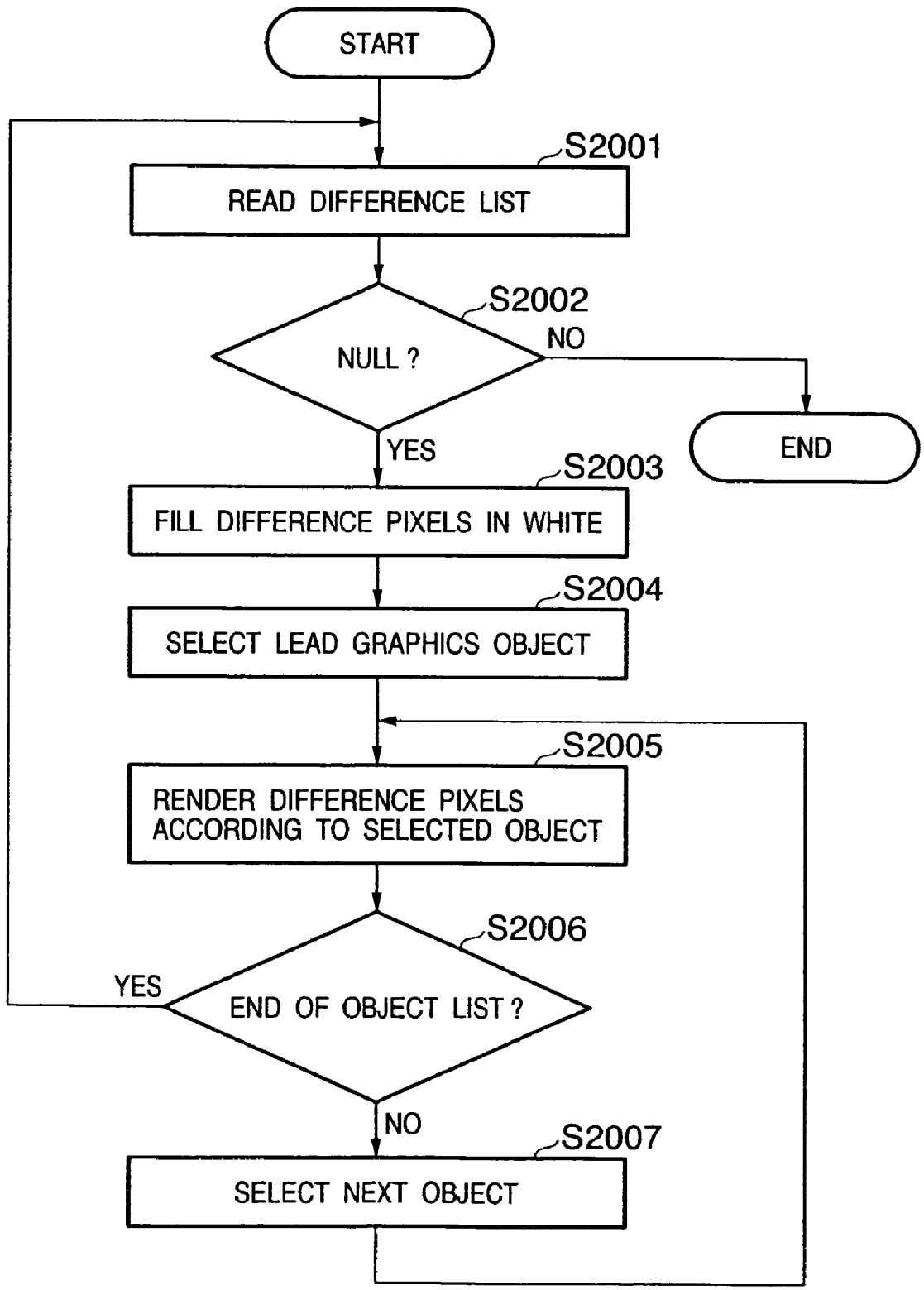
FIG. 20 is a flowchart for describing the image forming process of the third embodiment according to the present invention.

Next, a description will be given by using a flowchart of FIG. 20 as to a method of forming the target scan line in the buffer 2105 by means of the rendering unit 2104. As for the procedure of FIG. 20, the processing is performed by noting the scan line indicated by the difference list in the frame memory.

As described above, the storage unit 2107 has the difference list stored therein for each scan line. The rendering unit 2104 reads from the storage unit 2107 the difference list at the head of the scan line to be formed (S2001). It subsequently checks whether or not the read difference list is null (S2002). In the case where it is null, the rendering unit 2104 determines that there is no difference in the scan line to be processed (the target scan line) so as to finish formation of the scan line. In the case where the difference list is not null in the step S2002, a color value equivalent to white such as 0xffffff is written to the address of the buffer 2105 equivalent to the difference pixel represented by the difference list (S2003). It subsequently selects the graphics object at the head of the graphics object list of the difference list (S2004), and writes the color value to the address of the buffer 2105 equivalent to the difference pixel according to the selected graphics object (S2005). It subsequently checks whether or not there is a subsequent graphics object of the graphics object list of the difference list (S2008). If there is one, it selects the subsequent graphics object (S2007) and repeats the step S2005 onward. In the case where there is no subsequent graphics object in the step S2008, it returns to the step S2001 and repeats the above-mentioned process. When writing the color value in the step S2005, it follows the logic operation defined in the graphics object. In the case where the target scan line is the lead line of a frame, all the pixels thereof should be registered with the difference list as the difference pixels.

It is possible, by using this procedure, to compensate for the pixels of the objects corresponding to the positions of the difference pixels for each line based on the difference list thereof so as to implement the rendering in units of a scan line. Furthermore, the rendering of the difference pixels is sufficient so that rendering time can be reduced.

Figure 1:
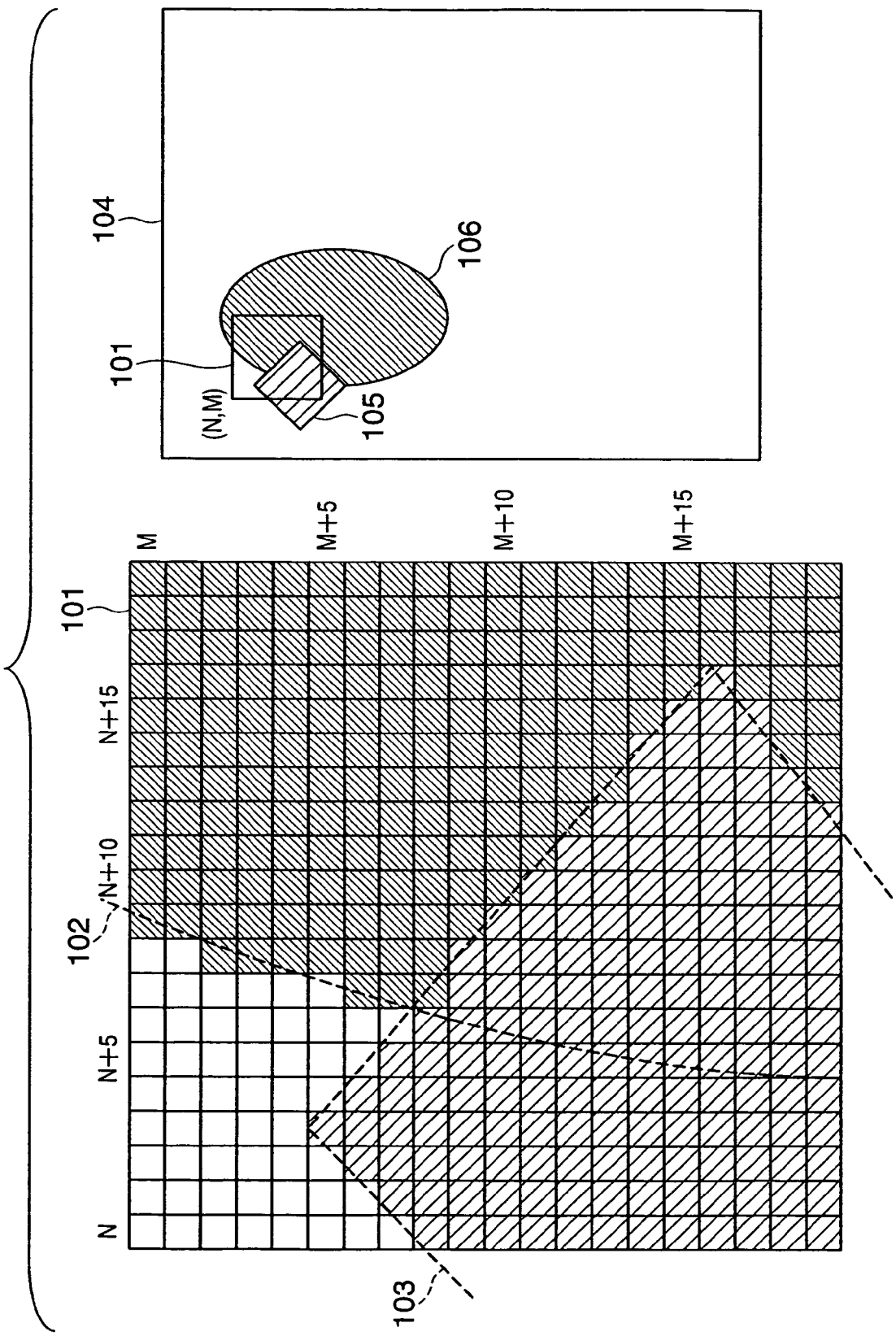
FIG. 1 is a diagram showing an example of pixels having differences in corresponding pixels respectively in a scan line of continuous graphics objects.
Figure 19:
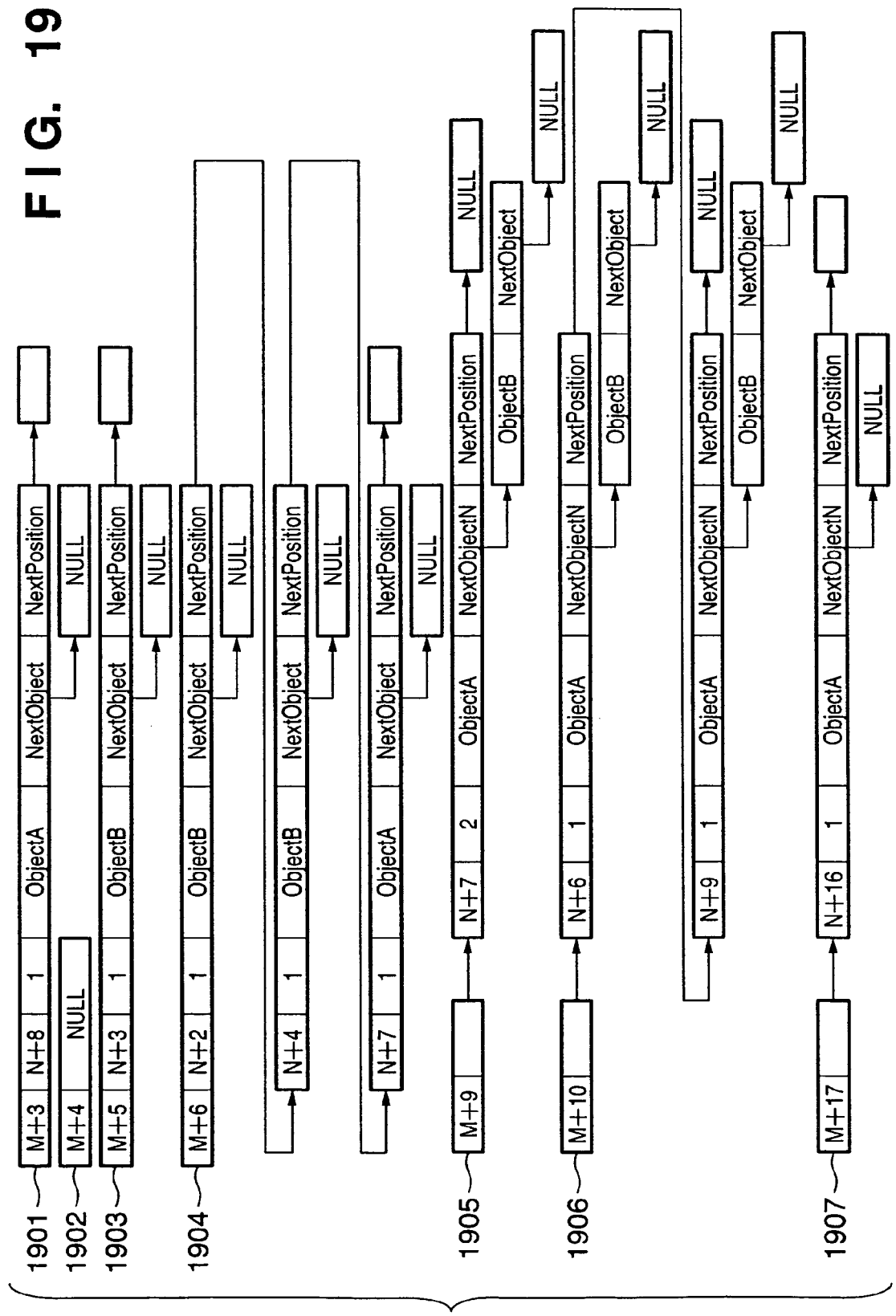
FIG. 19 is an example of the intermediate code representing the pixels having differences shown in FIG. 1 of the third embodiment.

FIG. 19 shows an example of the difference list corresponding to the image of FIG. 1. In the image of FIG. 1, a bit map 104 is a bit map to be formed, graphics objects 105, 106 are graphics objects A, B on the bit map 104, and an object 106 is rendered further in the depth than the object 105. An enlarged view 101 is a diagram having 20 square pixels enlarged in reference to coordinates (M, N) of the bit map 104. An edge 102 is an edge of the graphics object 105, and an edge 103 is an edge of the graphics object 106. In the enlarged view 101, the pixels having thicker frames are the pixels corresponding to an upper scan line as the difference pixels respectively. Reference numeral 1906 denotes the difference list of an (M+10)-th line. As is understandable in the enlarged view 101, one pixel becomes the difference pixel at a position (N+6) and a position (N+9) respectively. Both the pixels are overlapping in order of the object A and object B from the depth. Therefore, the object list has the graphics object list generated for one pixel in order of the object A and object B from the position (N+6). It is the same about one pixel from the position (N+9).

Inversely, the pixels of the object falling under the position and length is written on a dot image of the scan line immediately preceding it from the difference list of FIG. 19 so as to form the image of FIG. 1.

According to this embodiment, all the graphics objects to be rendered on the difference pixels are added to the graphics object list. In the case where the logic operation parameter of the graphics object included in the graphics object list indicates overwriting, it is possible to delete a graphics object linked before that graphics object from the list.

According to the present invention, it is desirable that the buffer 207 and the storage unit 209 are separate devices. However, the present invention is also applicable in the case of the same device.

Fourth Embodiment

Another embodiment according to the present invention will be described. This embodiment will omit a description of those already described. The printer controller of this embodiment is equal to the printer controller of the third embodiment of FIG. 21, and the intermediate code stored in the storage unit 2107 is the intermediate code described in the first embodiment. Hereunder, a description will be given as to the operation from a state in which the intermediate code is stored in the storage unit 2107.

Figure 22:
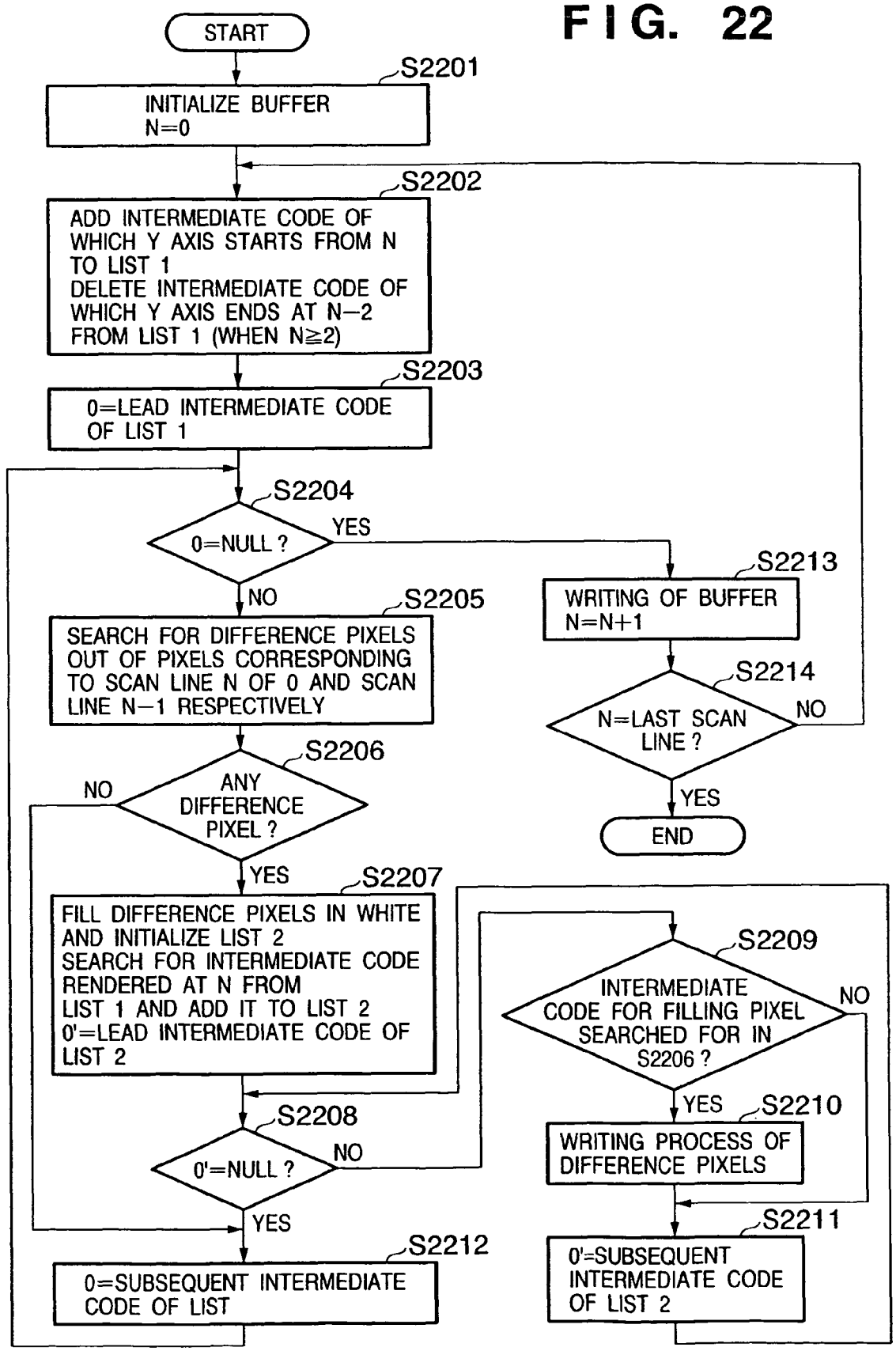
FIG. 22 is a flowchart for describing the image forming process of a fourth embodiment according to the present invention.

FIG. 22 is a flowchart of the rendering unit 2104 for describing the image forming method of this embodiment. First, the rendering unit 2104 initializes the buffer 2105 for storing the target scan line. It also initializes a parameter "N" representing the scan line in processing to 0 (S2201). It subsequently searches for the intermediate code of which scan line starts with "N" out of the intermediate codes stored in the storage unit 2107 so as to add it to a "list 1." The list 1 created in this case keeps the order of rendering the intermediate codes by linking the intermediate codes in rendering order on a bidirectional linked list for instance. In the case where "N" is 2 or more, it deletes from the list the intermediate code of the graphics object of which last scan line is "N−2" (S2202). This is because it is necessary to delete the pixels rendered with the graphics object in the scan line subsequent to the last scan line of the graphics object represented by the intermediate code.

It subsequently sets the intermediate code at the head of the list 1 to a parameter "O" prepared in the storage unit 2107 (S2203). For instance, it is possible to record the intermediate code itself at the head of the list 1 as the parameter "O" or record pointers and indexes leading thereto. It subsequently checks the parameter "O" and determines whether or not the intermediate code is selected (recorded) (S2204). In the case where the intermediate code is selected, it searches for the difference pixels out of the pixels corresponding to the target scan line "N" and the scan line "N−1" immediately preceding it of the intermediate code selected by the parameter "O" respectively (S2205).

As a result of the search in the step S2205, it determines whether or not there is a difference pixel (S2206). If determined that there is one, it fills the difference pixel with the color value equivalent to white such as 0xffffff in the buffer 2105. It initializes a "list 2" which is a different list from the "list 1" and sequentially searches for the intermediate codes rendered in the scan line "N" so as to sequentially link them to the "list 2." It also sets the intermediate code at the head of the list 2 to the parameter "O'" (S2207). It subsequently checks whether or not the intermediate code is selected for the parameter "O'" (S2208). In the case where the intermediate code is selected, it checks whether or not the object corresponding to the intermediate code selected for the parameter "O'" fills the difference pixel searched for in the step S2206 (S2209). If determined to fill it, the pixel searched for in the step S2206 is filled by the color value defined by the intermediate code selected for the parameter "O'" (S2210) and sets the parameter "O'" to the subsequent intermediate code on the "list 2" (S2211) so as to repeat the process from the step S2208.

If determined in the step S2209 that the object corresponding to the intermediate code selected for the parameter "O'" does not fill the difference pixel searched for in the step S2206, it moves on to the step S2211.

If no intermediate code is selected for the parameter "O'" in the step S2208, it sets the parameter "O" to the subsequent intermediate code on the "list 2" (S2212) and moves on to the step S2204.

If determined that there is no difference pixel in the step S2206, it moves on to the step S2212.

If no intermediate code is selected for the parameter "O" in the step S2204, it transmits the raster information of the buffer 2105 to the storage unit 2107 by means of the DMA 2106 and adds 1 to "N" to prepare for processing of the subsequent scan line (S2213). Here, even if the raster information of the buffer 2105 is transmitted to the storage unit 2107 by means of the DMA 2106, it holds the raster information of the buffer 2105. It subsequently checks whether or not "N" is the last scan line of the bit map to be formed (S2214). If not the last scan line, it moves on to the step S2202 and repeats the above-mentioned process. If determined to be the last scan line in the step S2214, it finishes the rendering process. In the step S2208, if the parameter "N" indicates the scan line subsequent to the last scan line of the graphics object indicated by the intermediate code, the pixel rendered in the last scan line becomes the difference pixel.

According to the present invention, it is desirable that the buffer 207 and the storage unit 209 are separate devices. However, the present invention is also applicable in the case of the same device.

It is possible, according to the above procedure, to render the difference pixel for each scan line by using the intermediate code compatible with the conventional ones, that is, while diverting a program for generating the conventional intermediate code so as to provide the image forming apparatus having improved speed of the rendering process.

Fifth Embodiment

A fifth embodiment according to the present invention will be described. This embodiment will omit a description of those described in the fourth embodiment.

Figure 23:
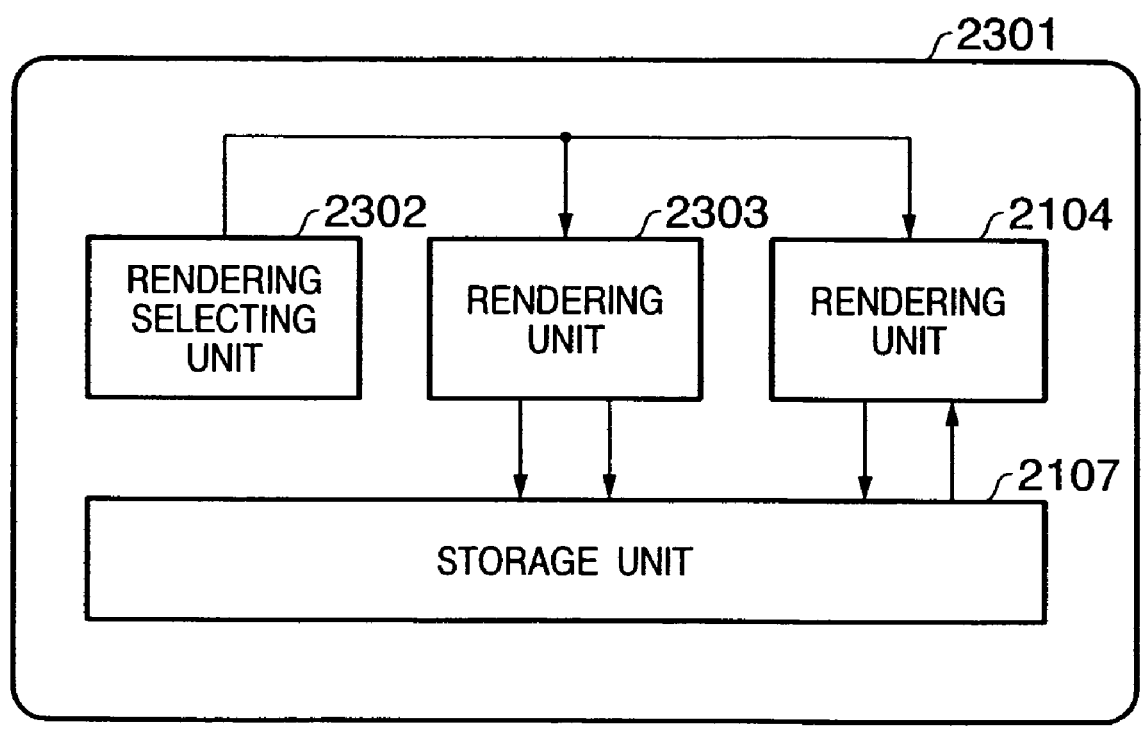
FIG. 23 is an example of a conceptual diagram of the printer controller of a fifth embodiment according to the present invention.

FIG. 23 is a diagram for describing this embodiment, where a printer controller 2301 comprises a rendering selecting unit 2302, the first rendering unit 2104, a second rendering unit 2303 and the storage unit 2107 as well as the I/F, interpreting unit, buffer, DMA, image processing unit and video transfer unit which are not shown. The first rendering unit 2104, storage unit 2107, I/F, interpreting unit, buffer, DMA, image processing unit and video transfer unit are the same as those described in the fourth embodiment, and so a description thereof will be omitted.

The image forming method according to this embodiment is the one taking advantage of such a characteristic of a high-resolution image that the differences occur to few of the pixels equivalent to continuous scan lines respectively. Therefore, there is a possibility that it may be less effective or slower than the conventional methods as to a low-resolution image. For that reason, the rendering selecting unit 2302 selects the first rendering unit 2104 or the second rendering unit 2303 of the conventional rendering method based on the resolution of the bit map to be outputted so as to select the rendering unit according to the resolution. To be more specific, the rendering process is performed by the rendering unit 2303 according to the fourth embodiment if the resolution is a certain resolution or higher, and is performed by the rendering unit 2104 if lower than the certain resolution. It was already described in the second embodiment that the intermediate code stored in the storage unit 2107 keeps compatibility with the intermediate code of the conventional rendering method.

It is possible, by having such a configuration, to maintain high rendering performance whether the resolution is high or low.

As for the second to fifth embodiments, it is possible, as with the first embodiment, to determine the difference according to its type, such as the rectangle, trapezoid, run length or bit map. As for the third embodiment, the difference is determined based on the print data received from the host computer instead of the conventional intermediate code. As the description of the object is basically the same, however, the difference can be determined in the third embodiment by the same method as in the first embodiment.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-257421 filed on Sep. 3, 2004, which is hereby incorporated by reference herein.

What is claimed is:

1. An image forming apparatus comprising:
   a determination unit configured to determine whether or not a target scan line is the first scan line on a raster image; and
   a transfer unit configured to write raster information in a buffer and transfer the raster information from the buffer to a storage unit,
   wherein when it is determined by said determination unit that the target scan line is the first scan line, said transfer unit writes raster information based on edge information of the target object in the buffer and transfers the raster information from the buffer to the storage unit, and
   when it is determined by said determination unit that the target scan line is not the first scan line, said transfer unit further determines whether or not the target scan line is monochromatic, and when it is determined that the target scan line is not monochromatic, said transfer unit writes the raster information of the entire target scan line based on the edge information of the target object in the buffer, when it is determined that the target scan line is monochromatic said transfer unit determines each difference pixel position between the target scan line and the previous scan line stored in the buffer, writes the raster information based on the edge information of the target object in the each determined difference pixel position of the buffer in which the previous scan line is stored, and transfers the raster information from the buffer to the storage unit.

2. The apparatus according to claim 1, further comprises:
a second determination unit configured to determine whether or not neither gray information nor BG information is null and gray information and BG information are monochromatic,
wherein, by said transfer unit, the difference pixel positions are determined to be all pixel positions in the scan line when it is determined that the gray information and/or BG information are null or gray information and/or BG information are monochromatic, and
wherein, by said transfer unit, each difference pixel position is determined to be a position at which runs of the target scan line and the previous scan line are different when it is determined that neither gray information nor BG information is null and gray information and BG information are monochromatic.

3. The apparatus according to claim 1, further comprises a printing unit configured to print a raster image stored in the storage unit.

4. A method of image forming performed by an image forming apparatus, said method comprising:
a determination step of determining whether or not a target scan line is the first scan line on a raster image; and
a transfer step of writing raster information in a buffer and transferring the raster information from the buffer to a storage unit,
wherein when it is determined in the determination step that the target scan line is the first scan line, said transfer step writes raster information based on edge information of the target object in the buffer and transfers the raster information from the buffer to the storage unit, and
when it is determined in the determination step that the target scan line is not the first scan line, said transfer step further determines whether or not the target scan line is monochromatic, and when it is determined that the target scan line is not monochromatic, said transfer step writes the raster information of the entire scan line based on the edge information of the target object in the buffer, when it is determined that the target scan line is monochromatic said transfer step determines each difference pixel position between the target scan line and the previous scan line stored in the buffer, writes the raster information based on the edge information of the target object in the each determined difference pixel position of the buffer in which the previous scan line is stored, and transfers the raster information from the buffer to the storage unit.

5. The method according to claim 4, further comprises:
a second determination step of determining whether or not neither gray information nor BG information is null and gray information and BG information are monochromatic,
wherein, in the transfer step, the difference pixel positions are determined to be all pixel positions in the scan line when it is determined that the gray information and/or BG information are null or gray information and/or BG information are monochromatic, and
wherein, in the transfer step, each difference pixel position is determined to be a position at which runs of the target scan line and the previous scan line are different when it is determined that neither gray information nor BG information is null and gray information and BG information are monochromatic.

6. The method according to claim 4, further comprises a printing step of printing a raster image stored in the storage unit by a printing unit.

7. A non-transitory computer-readable medium storing a program for causing a computer to perform a method of image forming, said method comprising:
a determination step of determining whether or not a target scan line is the first scan line on a raster image; and
a transfer step of writing raster information in a buffer and transferring the raster information from the buffer to a storage unit,
wherein when it is determined in the determination step that the target scan line is the first scan line, said transfer step writes raster information of the target object based on edge information in the buffer and transfers the raster information from the buffer to the storage unit, and
when it is determined in the determination step that the target scan line is not the first scan line, said transfer step further determines whether or not the target scan line is monochromatic, and when it is determined that the target scan line is not monochromatic, said transfer step writes the raster information of the entire target scan line based on the edge information of the target object in the buffer, when it is determined that the target scan line is monochromatic said transfer step determines each difference pixel position between the target scan line and the previous scan line stored in the buffer, writes the raster information based on the edge information of the target object in the each determined difference pixel position of the buffer in which the previous scan line is stored, and transfers the raster information from the buffer to the storage unit.

8. The non-transitory computer-readable medium according to claim 7, wherein said method further comprises:
a second determination step of determining whether or not neither gray information nor BG information is null and gray information and BG information are monochromatic,
wherein, in the transfer step, the difference pixel positions are determined to be all pixel positions in the scan line when it is determined that the gray information and/or BG information are null or gray information and/or BG information are monochromatic, and
wherein, in the transfer step, each difference pixel position is determined to be a position at which runs of the target scan line and the previous scan line are different when it is determined that neither gray information nor BG information is null and gray information and BG information are monochromatic.

9. The non-transitory computer-readable medium according to claim 7, wherein said method further comprises a printing step of printing a raster image stored in the storage unit by a printing unit.

* * * * *